US008346476B2

(12) United States Patent
Taguchi et al.

(10) Patent No.: US 8,346,476 B2
(45) Date of Patent: Jan. 1, 2013

(54) VEHICLE RUNNING CONTROL SYSTEM

(75) Inventors: Koji Taguchi, Isehara (JP); Takashi Suzuki, Susono (JP); Masaki Matsunaga, Ashigarakami-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 436 days.

(21) Appl. No.: 12/779,302

(22) Filed: May 13, 2010

(65) Prior Publication Data

US 2010/0292904 A1 Nov. 18, 2010

(30) Foreign Application Priority Data

May 13, 2009 (JP) .................. 2009-116487
Feb. 24, 2010 (JP) .................. 2010-039340

(51) Int. Cl.
*G01S 1/00* (2006.01)
(52) U.S. Cl. .......................... 701/424; 701/93
(58) Field of Classification Search .............. 701/93, 701/424
See application file for complete search history.

(56) References Cited

FOREIGN PATENT DOCUMENTS

| JP | 3-63283 B2 | 9/1991 |
|---|---|---|
| JP | 2001-63538 | 3/2001 |
| JP | 2002-370560 | 12/2002 |
| JP | 2006-163940 | 6/2006 |
| JP | 2006-327545 | 12/2006 |
| JP | 2008-287480 | 11/2008 |
| JP | 2009-149286 | 7/2009 |
| JP | 2010-41767 | 2/2010 |
| WO | WO 2009/057703 A1 | 5/2009 |

OTHER PUBLICATIONS

Takehiko Fujioka, et al., "Numerical Analysis of Minimum-Time Cornering the Fourth Report: Road Constraints Using Inequality Constraints on State Values", Society of Automotive Engineers of Japan 9304518, vol. 24, No. 3, Jul. 1993, pp. 106-111 (with English Abstract).
Office Action issued Mar. 1, 2011 in Japan Application No. 2009-116487 (With Partial English Translation).

*Primary Examiner* — Hussein A. Elchanti
(74) *Attorney, Agent, or Firm* — Oblon, Spivak, McClelland, Maier & Neustadt, L.L.P.

(57) ABSTRACT

A vehicle running control system includes: a speed pattern creating unit that creates a speed pattern according to a target traveling path, a running control unit that controls running of the vehicle based on the speed pattern, a first speed condition correcting unit that correct speed conditions in a direction from a start position of the running control toward an end position of the running control on the target traveling path, and a second speed condition correcting unit that correct speed conditions in a direction from the end position of the running control toward the start position of the running control on the target traveling path.

22 Claims, 21 Drawing Sheets

| REGION | ASSIST CONTROL |
|---|---|
| ACCELERATION REGION | · NEEDLESS ACCELERATION LIMITATION (RESTRICTION)<br>· ACCELERATION ASSIST |
| COASTING REGION | · ACCELERATION LIMITATION (RESTRICTION)<br>· COASTING ASSIST<br>(MT: AS IN N RANGE, HV: COMMAND TORQUE = 0) |

VEHICLE RUNNING CONTROL SYSTEM

INCORPORATION BY REFERENCE

The disclosure of Japanese Patent Application No. 2009-116487 filed on May 13, 2009 and Japanese Patent Application No. 2010-39340 filed on Feb. 24, 2010 each including the specification, drawings and abstract is incorporated herein by reference in its entirety.

BACKGROUND OF THE INVENTION

1. Field of the Invention

The invention relates to a vehicle running control system that creates a traveling path along which the vehicle is going to run, creates a speed pattern according to the traveling path, and controls running of the vehicle based on the traveling path and the speed pattern.

2. Description of the Related Art

A technology of creating the optimum traveling track of the vehicle and automatically running the vehicle using the traveling track has been developed. An example of the technology is described in a paper on "Numerical Analysis of Minimum-Time Cornering Method (Takehiko Fujioka, Daisuke. Emori: JSAE (Society of Automotive Engineers of Japan) papers, Vol. 24, No. 3, July 1993, p 106-p 111)". This paper is concerned with a method of calculating an ideal track utilizing an optimization method, in which a length of time required to pass a corner is set as an evaluation function, and the ever-changing position and speed of the vehicle are calculated using the optimization method so that the evaluation function is minimized, so as to create a traveling track and a speed pattern which enable the vehicle to pass the corner in the minimum time.

In the technology of the above-identified paper, the position (track) and speed of the vehicle are changed, and evaluation functions are based on convergent calculations that are repeatedly performed while monitoring changes in the position and speed; therefore, when highly accurate traveling track and speed pattern of the vehicle are to be created, the number of calculations is increased, and the calculation time is prolonged. Therefore, a highly accurate, expensive control system needs to be installed on the vehicle.

Also, Japanese Patent Application Publication No. 2006-327545 (JP-A-2006-327545) discloses a system that sets sections for a target track (all of the sections) in a traveling plan of a mobile unit including a vehicle, and sets constraints to movement for each section, so as to improve a traveling result when the vehicle runs over all of the sections.

However, the system of JP-A-2006-327545 does not take account of how vehicle control based on a target speed pattern and driver's operations are coordinated, so as to make the actual speed pattern close to the target speed pattern, while meeting with the requested acceleration entered through the actual operation of the driver. Thus, there is room for improvement in coordinating vehicle control based on a traveling plan and driver's operations with further improved efficiency.

More specifically, typical examples of assist systems for improved fuel efficiency include, for example, "ECO MODE" of Toyota Motor Corporation, "ECON" of Honda Motor Co., Ltd., and "SI-DRIVE" of Fuji Heavy Industries Ltd. The respective systems of these companies are operable to change the accelerator pedal input in the form of depression of the accelerator pedal by the driver, by a moderate degree, for improvement in the fuel efficiency or fuel economy. Also, these systems are configured such that the driver makes a mode selection by means of, for example, a switch (SW).

However, these systems regard driver's operations as predominant inputs (true answers), and is not able to determine whether an input in the form of a driver's operation on the accelerator pedal or brake pedal is unnecessary or useless. In these systems, therefore, the inputs in the form of driver's operations are kept being predominant, and the control side provides only limited assistance for improvement of the fuel efficiency. Consequently, these systems can improve the fuel efficiency only by about 5% (a nominal value), and have difficulty in achieving a significant improvement in the fuel efficiency.

SUMMARY OF THE INVENTION

The invention provides a vehicle running control system that creates a speed pattern according to a traveling path within a short time, and permits appropriate running control of the vehicle based on the speed pattern.

The invention also provides a vehicle running control system that coordinates vehicle control based on a traveling plan and driver's operations with improved efficiency, so that the traveling plan can be accomplished with increased reliability.

One aspect of the invention is concerned with a vehicle running control system. The vehicle running control system includes a speed pattern creating unit that creates a speed pattern according to a target traveling path, a running control unit that controls running of the vehicle based on the speed pattern, a first speed condition correcting unit that corrects speed conditions in a direction from a start position of the running control toward an end position of the running control on the target traveling path, and a second speed condition correcting unit that corrects speed conditions in a direction from the end position of the running control toward the start position of the running control on the target traveling path.

According to the above aspect of the invention, the vehicle running control system is provided with the first speed condition correcting unit that corrects speed conditions in the direction from the start position of running control to the end position of running control on the target traveling path, and the second speed condition correcting unit that corrects speed conditions in the direction from the end position of running control to the start position of running control on the target traveling path. Therefore, the system creates the speed pattern according to the traveling path within a short time, and permits appropriate running control of the vehicle based on the speed pattern.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Some embodiments of the invention in the form of vehicle running control systems will be described in detail with reference to the drawings. It is, however, to be understood that the invention is not limited to these embodiments.

Figure 1:
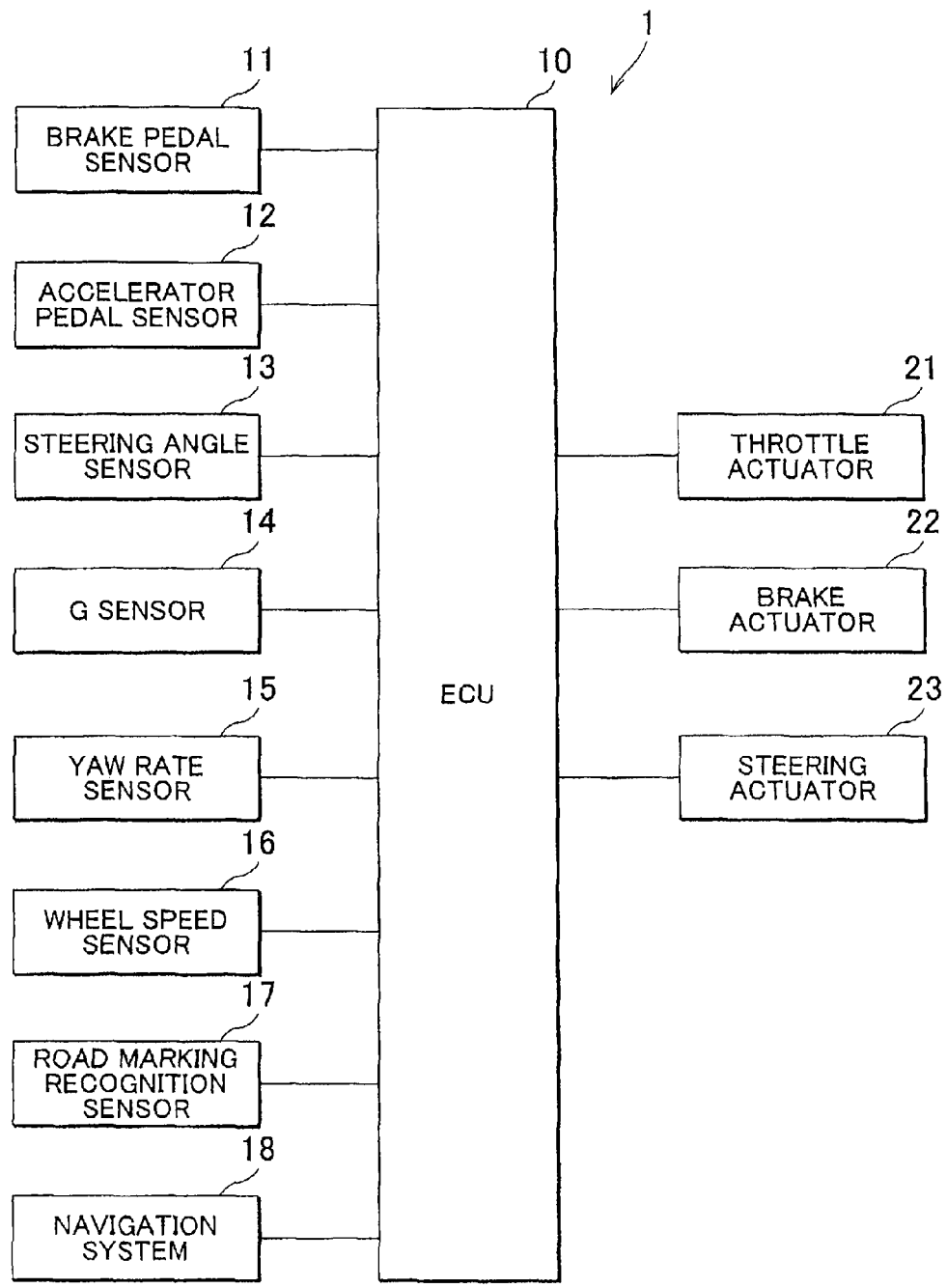
FIG. 1 is a schematic view showing the configuration of a vehicle running control system according to a first embodiment of the invention.
Figure 2:
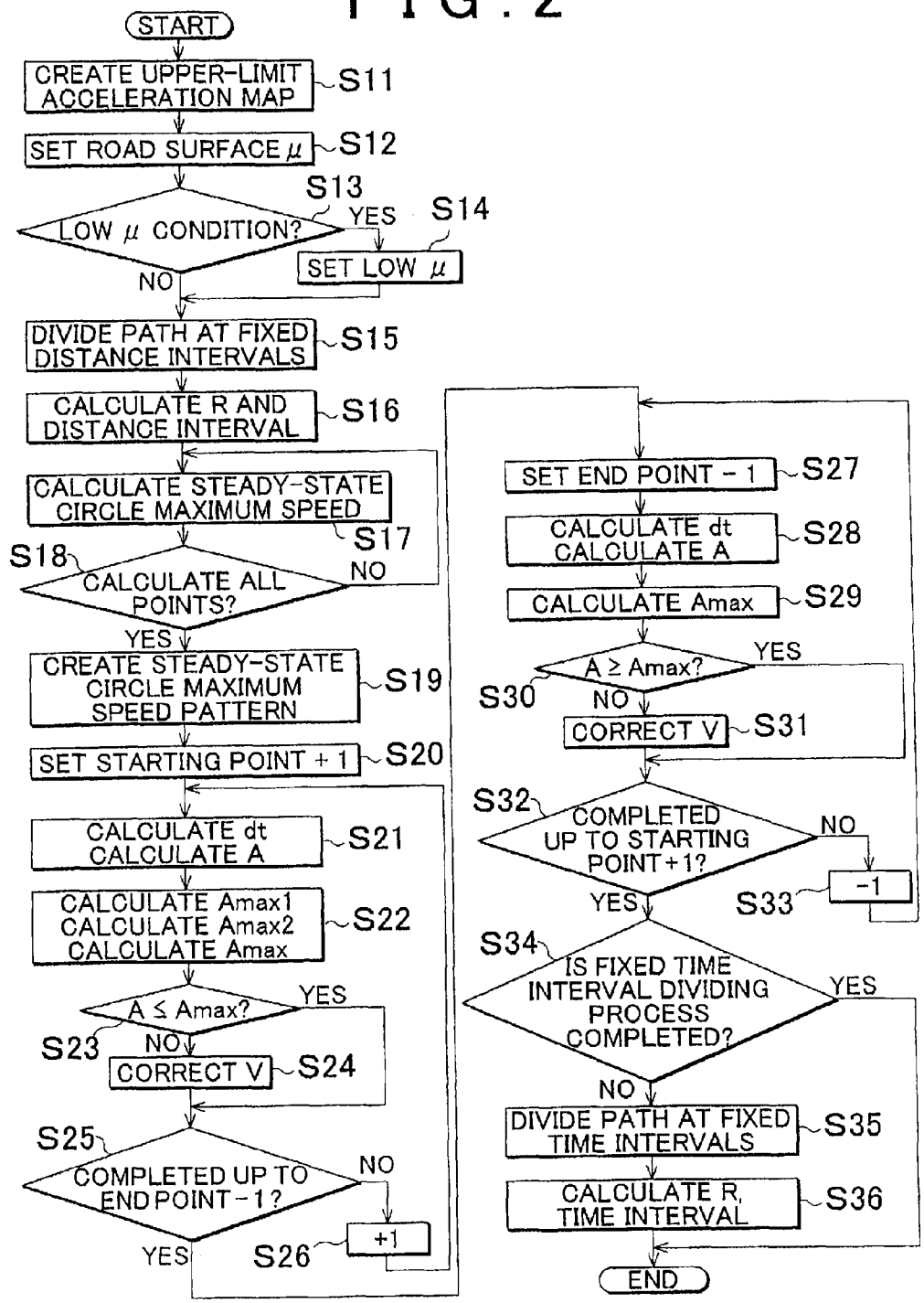
FIG. 2 is a flowchart illustrating a process of creating a speed pattern according to a traveling path, which is executed by the vehicle running control system of the first embodiment.
Figure 3:
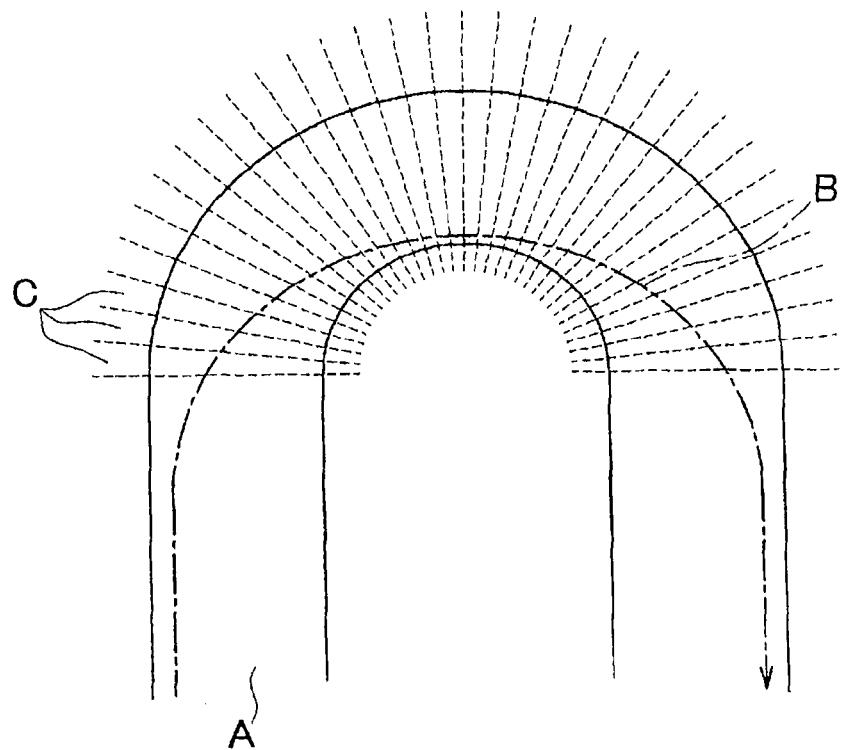
FIG. 3 is a schematic view useful for explaining the process of creating a speed pattern.
Figure 4:
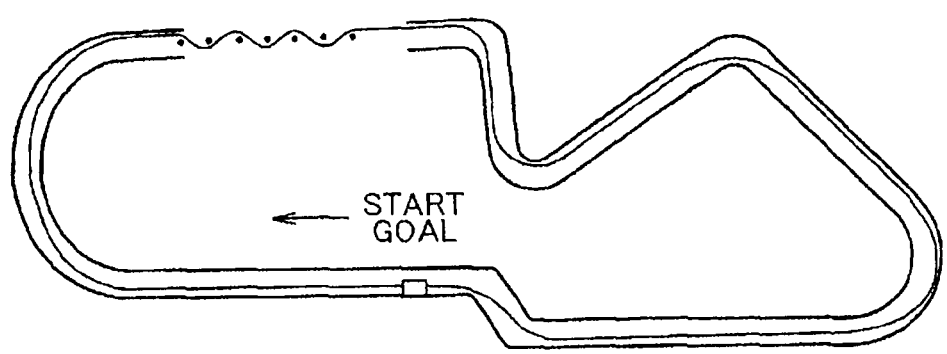
FIG. 4 is a schematic view showing a traveling course of the vehicle.
Figure 5:
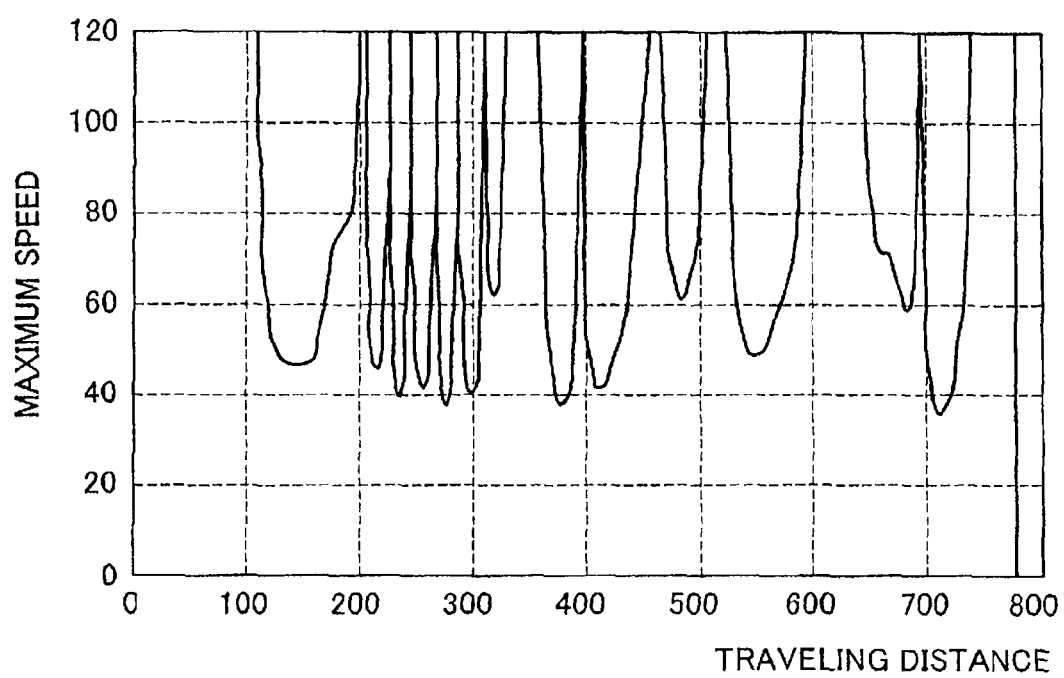
FIG. 5 is a graph indicating a speed pattern during regular circle cornering on the traveling course.
Figure 6:
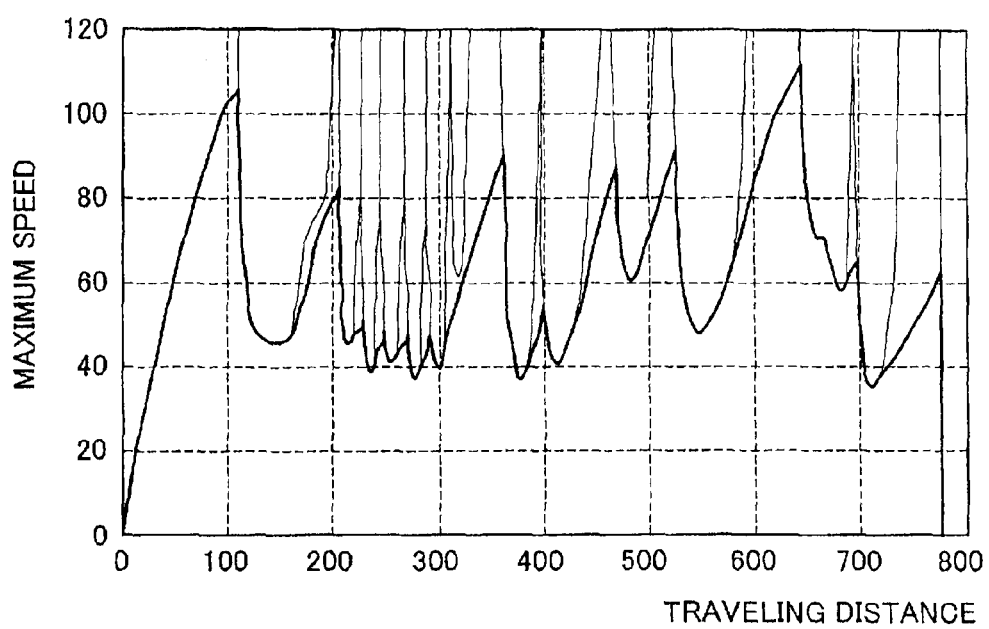
FIG. 6 is a graph indicating a speed pattern obtained by making acceleration correction to the speed pattern of regular circle cornering on the traveling course.
Figure 7:
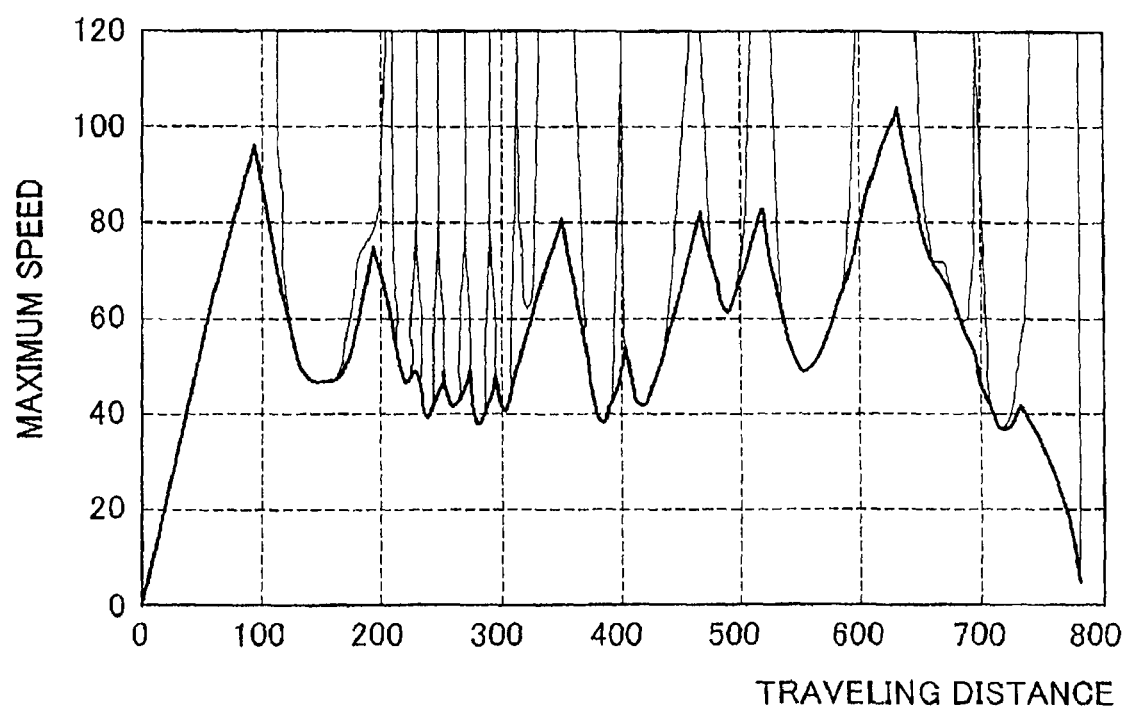
FIG. 7 is a graph indicating a speed pattern obtained by making acceleration correction and deceleration correction to the speed pattern of regular circle cornering on the traveling course.
Figure 8A:
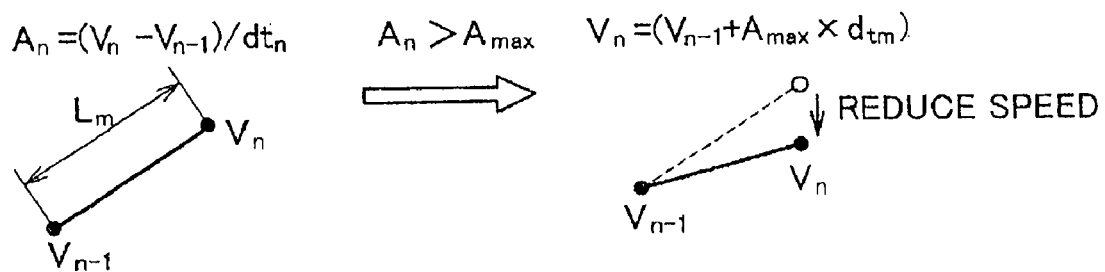
FIG. 8A is an explanatory view showing acceleration correction made to a speed pattern of regular circle cornering.
Figure 8B:
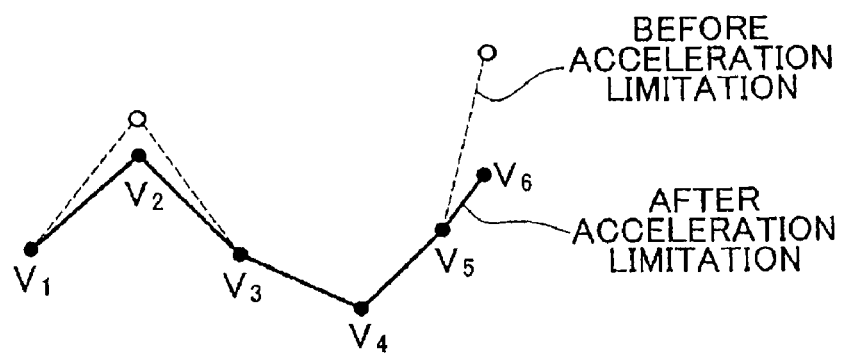
FIG. 8B is an explanatory view showing speed patterns before and after acceleration correction is made.

FIG. 1 is a schematic view showing the configuration of a vehicle running control system 1 according to a first embodiment of the invention, and FIG. 2 is a flowchart illustrating a process according to which the vehicle running control system 1 of the first embodiment creates a speed pattern according to a traveling path, while FIG. 3 is a schematic view useful for explaining the process of creating a speed pattern. FIG. 4 is a schematic view showing a traveling course of the vehicle, and FIG. 5 is a graph indicating a speed pattern during regular circle cornering on the traveling course, while FIG. 6 is a graph indicating a speed pattern obtained by making acceleration correction to the speed pattern of regular circle cornering on the traveling course. FIG. 7 is a graph indicating a speed pattern obtained by making acceleration correction and deceleration correction to the speed pattern of regular circle cornering on the traveling course, and FIG. 8A is a view useful for explaining acceleration correction made to a speed pattern of regular circle cornering, while FIG. 8B is a view useful for explaining speed patterns before and after acceleration correction is carried out.

In the vehicle running control system 1 of this embodiment, a brake pedal sensor 11, an accelerator pedal sensor 12, a steering angle sensor 13, a G (acceleration) sensor 14, a yaw rate sensor 15, wheel speed sensors 16, a road marking recognition sensor 17, and a navigation system 18 are connected to an electronic control unit (ECU) 10, as shown in FIG. 1.

The brake pedal sensor 11 detects the amount of depression (brake pedal stroke or pedal effort) of the brake pedal depressed by the driver, and outputs the detected amount of depression of the brake pedal to the ECU 10. The accelerator pedal sensor 12 detects the amount of depression (accelerator pedal position) of the accelerator pedal depressed by the driver, and outputs the detected amount of depression of the accelerator pedal to the ECU 10. The steering angle sensor 13 detects the steering angle of the steering wheel operated by the driver, and outputs the detected steering angle to the ECU 10.

The G (acceleration) sensor 14 detects the longitudinal acceleration and lateral acceleration applied to the vehicle, and outputs each of the detected accelerations to the ECU 10. The yaw rate sensor 15 detects the yaw rate (lateral turning speed) generated in the vehicle, and outputs the detected yaw rate to the ECU 10. The wheel speed sensor 16, which is provided for each of the four wheels of the vehicle, detects the rotational speed of each wheel, and outputs the detected rotational speed of each wheel to the ECU 10. The ECU 10 calculates the vehicle speed V based on the rotational speeds of the respective wheels.

The road marking recognition sensor 17, which has a camera and an image processing device, detects right and left road lines located at the opposite sides of a lane on which the vehicle is running, and outputs the positions (coordinates) of the detected right and left road lines to the ECU 10. The ECU 10 calculates a line (centerline) that passes the center of the vehicle, the radius of curvature of the centerline, and so forth, based on the positions of the road lines. The navigation system 18 is configured to detect the current position of the vehicle, and guide the driver to a destination along a certain path, for example. In particular, the navigation system 18 reads the shape of the road on which the vehicle is currently running, from a map database, and outputs the road shape information to the ECU 10.

Also, a throttle actuator 21, a brake actuator 22, and a steering actuator 23 are connected to the ECU 10.

The throttle actuator 21 is operable to open and close a throttle valve of an electronic throttle device, and adjust the throttle opening. The ECU 10 operates the throttle actuator 21 according to an engine control signal, so as to adjust the opening of the throttle valve. The brake actuator 22 is operable to adjust control oil pressures applied to wheel cylinders provided in a brake system. The ECU 10 operates the brake actuator 22 according to a brake control signal, so as to adjust the brake pressures of the wheel cylinders. The steering actuator 22 is operable to apply rotary driving force generated by a motor, as steering torque, to a steering mechanism via a speed reduction mechanism. The ECU 10 operates the steering actuator 23 according to a steering control signal, so as to adjust the steering torque by means of the motor.

When the vehicle is caused to automatically run along a road of a certain shape, the ECU 10 needs to set a target traveling path according to the road shape, in view of the fuel efficiency, time required to pass the path, safety, etc., and also needs to set a speed pattern. In this case, the target traveling path is a traveling path along which the vehicle is expected to run. In the case where the target traveling path includes one or more curved portions (target curved paths), information or data concerning the target traveling path includes a large number of parameters, such as the position of the vehicle, vehicle speed, acceleration, and yaw rate, which are necessary to run the vehicle.

The vehicle running control system 1 of the first embodiment has a standard speed pattern creating unit that creates a speed pattern (regular circle maximum speed pattern) that is normally created, a control unit that controls running of the vehicle based on the speed pattern, a first speed condition correcting unit that performs an operation to correct speed conditions in the speed pattern, from a start position at which running control is started to an end position at which the running control is finished, on the target traveling path, and a second speed condition correcting unit that performs an operation to correct speed conditions in the speed pattern, from the end position of running control to the start position of running control on the target traveling path. Namely, the first speed condition correcting unit, when performing the correcting operation, sequentially corrects speed conditions in the order in which they appear in the speed pattern as viewed in a direction from the start position of this operation toward the end position, on the target traveling path. Also, the second speed condition correcting unit, when performing the correcting operation, sequentially corrects speed conditions in the order in which they appear in the speed pattern as viewed in a direction from the end position of this operation toward the start position, on the target traveling path.

The first speed condition correcting unit corrects speed conditions that represent or provide accelerations (which may also be called "acceleration-side speed conditions"), and the second speed condition correcting unit corrects speed conditions that represent or provide decelerations (which may also be called "deceleration-side speed conditions"). In this case, the first speed condition correcting unit and second speed condition correcting unit correct appropriate ones of the speed conditions to lower speeds.

Also, the vehicle running control system 1 of the first embodiment includes a traveling path dividing unit that divides the target traveling path into a plurality of regions at evenly spaced (distance or time) intervals, and the first speed condition correcting unit and second speed condition correcting unit performs a correcting operation on a speed condition for each of the regions into which the target traveling path is divided. More specifically, each of the first and second speed condition correcting units compares speed conditions of adjacent ones of the regions, and corrects the speed condition of the higher-speed region to a lower speed.

More specifically, the first speed condition correcting unit performs a speed-condition correcting operation for each of the regions into which the target traveling path is divided, by calculating an acceleration across adjacent ones of the regions, and correcting an appropriate one of the speed conditions to a lower speed so as to prevent the acceleration from exceeding the upper limit. On the other hand, the second speed condition correcting unit performs a speed-condition correcting operation for each of the regions into which the target traveling path is divided, by calculating a deceleration across adjacent ones of the regions, and correcting an appropriate one of the speed conditions to a lower speed so as to prevent the deceleration from exceeding the upper limit.

In this embodiment, the ECU 10 functions as the above-mentioned standard speed pattern creating unit, the first speed condition correcting unit, and the second speed condition correcting unit, and performs various operations as described below.

The vehicle running control system 1 of the first embodiment will be described more specifically. In the field of the running control mechanics of the vehicle, the following general formula (equation of motion) is established:

$$V^2 = Ay \times R = \mu \times g \times R$$

where V is the speed of the vehicle, $V^2$ is the maximum speed of the vehicle, Ay is the lateral acceleration of the vehicle, g is the gravitational acceleration, $\mu$ is the coefficient of friction between tires and a road surface, and R is the turning radius of the road.

The ECU 10 of the vehicle running control system 1 of the first embodiment creates a traveling path along which the vehicle is going to run, and also creates a speed pattern according to the traveling path, using the above-indicated equation of motion as a precondition, in order to keep safety within friction circles of the tires.

Initially, the ECU 10 causes the navigation system 18 to read the road shape of a course along which the vehicle is going to run, from a map database, and sets a target traveling path. Then, the target traveling path is divided into a plurality of regions at fixed infinitesimal intervals (of distance). In this case, after creating a speed pattern according to the traveling path, the ECU 10 may divide the target traveling path into a plurality of regions at fixed infinitesimal intervals (of time), and perform operations as described later.

Then, the ECU 10 calculates the turning radius R of the road, in each of the regions into which the target traveling path is divided at the fixed infinitesimal intervals, and calculates the maximum speed of the vehicle running in each region according to the above-described precondition (equation of motion), using the turning radius R and the coefficient of friction $\mu$ between the tires and the road surface. Then, the ECU 10 creates a steady-state circle maximum speed pattern, using a plurality of maximum speeds obtained with respect to the respective regions into which the target traveling path is divided. In this case, the coefficient of friction $\mu$ may be estimated based on information obtained from the navigation system 18.

Once the steady-state circle maximum speed pattern of the target traveling path is created, the ECU 10 calculates an acceleration across adjacent points set in sequence in a direction from a running start point at which the vehicle starts running to a running end point at which the vehicle finishes running. If the acceleration exceeds the upper limit, the ECU 10 corrects the speed of one of the points having the higher speed and located closer to the running end point, to a lower speed, so that the acceleration becomes equal to or smaller than the upper-limit acceleration. In this case, the upper-limit acceleration is set to the lower one of a value obtained from the running performance of the vehicle and a value that causes the vehicle (tire) to go beyond the friction circle.

Also, the ECU 10 calculates a deceleration across adjacent points set in sequence in a direction from the running end point to the running start point. If the deceleration exceeds the upper limit, the ECU 10 corrects the speed of one of the points having the higher speed and located closer to the running start point, to a lower speed, so that the deceleration becomes equal to or smaller than the upper-limit deceleration. In this case, the upper-limit deceleration is set to the lower one of a value obtained from the running performance of the vehicle and a value that causes the vehicle (tire) to go beyond the friction circle.

In the above manner, corrections of the maximum speeds according to the accelerations and decelerations are made to the steady-state circle maximum speed pattern, between the running start point and the running end point, so that a speed pattern corresponding to the target traveling is created.

A process of creating the speed pattern according to the traveling path, which is carried out by the vehicle running control system 1 of the first embodiment, will be described in detail, with reference to the flowchart of FIG. 2.

In the process of creating the speed pattern according to the traveling path, the ECU 10 of the vehicle running control system 1 of the first embodiment creates a map of the upper-limit acceleration relative to the speed according to the specifications of the vehicle, for the set target traveling path, in step S11 as shown in FIG. 2. In step S12, the ECU 10 sets the coefficient of friction μ between the tires and the road surface. In this case, μ is set to, for example, 0.6, when the road surface is that of an ordinary road. If it is determined in step S13 that snow accumulates on the road, or the road is an icy, low μ road, μ is set to, for example, 0.2 in step S14.

In step S15, the ECU 10 divides the target traveling path into a plurality of regions at fixed infinitesimal distance intervals (e.g., 1 m). Then, the ECU 10 creates an array of coordinates of respective points placed in the plurality of regions into which the target traveling path is divided. In this case, the running start point is expressed as a point of coordinates (0, 0), and a point that is spaced on the north apart from the start point by x(m) and spaced on the east apart from the start point by y(m) is expressed as a point of coordinates (x, y). A typical point of each of the regions, for example, a center point in each of the regions or an average of two or more points, is represented by a point on the coordinate system. The target traveling path is presumed to be prepared as an array or arrangement of coordinates (x, y) that are discretely arranged at uneven intervals. In this case, generally known linear interpolation is performed at certain distance intervals. The calculation results of linear interpolation involve errors if the distance between adjacent points is largely different from one location to another when data of the adjacent points is processed. Thus, if the distance between points in the vicinity of the point in question is substantially equal, different distance intervals in regions that are spaced by a great distance (e.g., 10 m) apart from the point do not much matter.

More specifically, the ECU 10 sets a target traveling path B with respect to a certain curved road A, as shown in FIG. 3. Then, the ECU 10 divides the target traveling path B at fixed infinitesimal intervals along the longitudinal direction of the curved road A, so as to define a plurality of regions C. In this case, an intersection point of the target traveling path B and the first division line is defined as a running start point, and an intersection point of the target traveling path B and the last division line is defined as a running end point. Also, an interval or distance between points of intersection between the target traveling path B and each of the regions into which the curved road is divided between the running start point and the running end point is defined as a distance L between two points as described later.

Subsequently, in step S16, the ECU 10 creates a plurality of arrays of the turning radius R (not shown) relative to the distance from the running start point and the distance interval, in the above-indicated plurality of regions C into which the target traveling path is divided. In this case, the turning radius R may be calculated by a generally known, mathematical calculation method for obtaining the radius of a circle that passes three points. However, since data acquired from the navigation system 18 of the vehicle includes noise, the three points used for the above calculation may not be located adjacent to each other, but may be appropriately spaced (by, for example, 10 m) from each other.

Then, in step S17, the ECU 10 calculates the maximum speed V of the vehicle in each of the division regions C according to the equation of motion, using the turning radius R of the road, and the coefficient μ of friction between the tires and the road surface. At the running start point and the running end point, the maximum speeds V are set as the initial speed and the final speed, respectively. If the ECU 10 determines in step S18 that the maximum speed V of the vehicle has been calculated with respect to all of the division regions C of the target traveling path, the ECU 10 creates a steady-state circle maximum speed pattern in step S19.

Namely, a steady-state circle maximum speed pattern as shown in FIG. 5 is created with respect to a traveling course as shown in FIG. 4. The steady-state maximum speed pattern indicates the maximum speed V in relation to the distance to be traveled from the start point.

In steps S20 to S26, the ECU 10 corrects the maximum speed V based on the acceleration across adjacent points set in sequence in a direction from the running start point to the running end point, with respect to the steady-state circle maximum speed pattern of the target traveling path created in step S19. Namely, the ECU 10 sets a region C that is advanced by one region from the running start point toward the running end point in step S20. In step S21, the ECU 10 calculates a pass time $dt_n$ from the distance $L_n$ between two points of the maximum speed $V_n$ of this region $C_n$ (running start point+1) and the maximum speed $V_{n-1}$ of the region $C_{n-1}$ located ahead of the region $C_n$, according to the following equation.

$$dt_n = L_n / ((V_{n-1} + V_n)/2)$$

Subsequently, the acceleration $A_n$ at this time is calculated according to the following equation.

$$A_n = (V_n - V_{n-1})/dt_n$$

In step S22, the ECU 10 extracts the upper-limit acceleration $A_{max1}$ corresponding to the maximum speed $V_{n-1}$ from a map (maximum speed–upper-limit acceleration map set in accordance with the vehicle performance), and also calculates the maximum acceleration $A_{max2}$ (coefficient of friction μ×gravitational acceleration g) corresponding to the coefficient of friction μ. Here, the lower numerical value of the upper-limit acceleration $A_{max1}$ and the maximum acceleration $A_{max2}$ is set to the upper-limit acceleration $A_{max}$, as indicated by the following equation.

$$A_{max} = \min(A_{max1}, A_{max2})$$

In step S23, the ECU 10 determines whether the acceleration $A_n$ is equal to or smaller than the upper-limit acceleration $A_{max}$. If it is determined in step S23 that the acceleration $A_n$ is equal to or smaller than the upper-limit acceleration $A_{max}$, the control proceeds to step S25. If it is determined in step S23 that the acceleration $A_n$ is larger than the upper-limit acceleration $A_{max}$, the ECU 10 corrects the maximum speed $V_n$ in step S24, according to the following equation.

$$V_n(V_{n-1}+A_{max} \times dt_n)$$

Namely, if the acceleration exceeds the upper limit, the ECU 10 corrects the speed at one of the two adjacent points having the higher speed and located closer to the running end point, to a lower speed, so that the acceleration across the region C between the two points becomes equal to or lower than the upper-limit acceleration.

In step S25, the ECU 10 determines whether the operation to correct the maximum speed Vn is completed over a range from a point following the running start point to a point ahead of the running end point. If it is determined in step S25 that the operation to correct the maximum speed Vn has not been completed with respect to all of the regions C, the ECU 10 sets the region C to a region that is advanced by one region toward the running end point from the region (or point) on which the correcting operation has been performed, and the process of steps S21 to S24 is repeated. Then, if it is determined in step S25 that the operation to correct the maximum speed $V_n$ is completed over the range from the point following the running start point to the point ahead of the running end point, the control proceeds to step S27.

The operation to correct the maximum speed $V_n$ from the running start point toward the running end point will be described in detail. When the location (point) of the maximum speed $V_n$ and the location (point) of the maximum speed $V_{n-1}$ ahead of that of the maximum speed $V_n$ are set as shown in FIG. 8A, the distance between these two points is denoted as $L_n$. At this time, pass time $dt_n$ it takes to pass the distance $L_n$ between the point of the maximum speed $V_n$ and the point of the maximum speed $V_{n-1}$ is obtained, and the acceleration $A_n$ of the vehicle at this time is calculated. Then, if the acceleration $A_n$ is larger than the upper-limit acceleration $A_{max}$, the ECU 10 corrects the maximum speed $V_n$. In this case, the ECU 10 corrects the maximum speed $V_n$ at the point having the higher speed and located closer to the running end point, to a lower speed. By repeatedly performing the operation to correct the maximum speed $V_n$ with respect to the respective regions C, variations in the maximum speed $V_n$ are reduced in the maximum speed pattern, as shown in FIG. 8B.

If the operation to correct the maximum speed $V_n$ in the direction from the running start point toward the running end point is performed on the steady-state circle maximum speed pattern, the acceleration-side vehicle speed in each region C is corrected, on each curved road, as indicated by a thick line in FIG. 6.

In steps S27 to S33, the ECU 10 corrects the maximum speed $V_n$ based on the deceleration across adjacent points set in sequence in a direction from the running end point to the running start point, with respect to the steady-state circle maximum speed pattern of the target traveling path. Namely, the ECU 10 sets a region C that is retracted by one region from the running end point toward the running start point in step S27. In step S28, the ECU 10 calculates a pass time $dt_n$ from the distance $L_n$ between two points of the maximum speed $V_n$ of this region $C_n$ (the running end point−1) and the maximum speed $V_{n+1}$ of the region $C_{n+1}$ located ahead of the region $C_n$, according to the following equation.

$$dt_n = L_n / ((V_n + V_{n+1})/2)$$

Subsequently, the deceleration $A_n$ at this time is calculated according to the following equation.

$$A_n = (V_{n+1} - V_n)/dt_n$$

In step S29, the ECU 10 calculates the maximum deceleration $A_{max}$ (the coefficient of friction µ× gravitational acceleration g) corresponding to the coefficient of friction µ.

In step S30, the ECU 10 determines whether the deceleration $A_n$ is equal to or larger than the upper-limit deceleration $A_{max}$. If it is determined that the deceleration $A_n$ is equal to or larger than the upper-limit deceleration $A_{max}$, the control proceeds to step S32. If it is determined that the deceleration $A_n$ is smaller than the upper-limit deceleration $A_{max}$, the ECU 10 corrects the maximum speed $V_n$ in step S31 according to the following equation.

$$V_n = (V_{n+1} + A_{max} \times dt_n)$$

Namely, if the deceleration exceeds the upper limit, the ECU 10 corrects the speed at the point having the higher speed and located closer to the running start point, to a lower speed, so that the deceleration becomes equal to or smaller than the upper-limit deceleration.

In step S32, the ECU 10 determines whether the operation to correct the maximum speed $V_n$ is completed over a range from a point located ahead of the running end point to a point following the running start point. If it is determined in this step that the operation to correct the maximum speed $V_n$ has not been completed with respect to all of the regions, the ECU 10 sets the region C to a region that is retracted by one region from the region (or point) on which the correcting operation has been performed toward the running start point in step S33, and the process of steps S28 to S31 is repeated. Then, if it is determined in step S32 that the operation to correct the maximum speed $V_n$ is completed over the range from the point ahead of the running end point to the point following the running start point, the control proceeds to step S34.

If the operation to correct the maximum speed $V_n$ in the direction from the running end point toward the running start point is performed on the steady-state circle maximum speed pattern, the deceleration-side vehicle speed in each region C is adequately corrected, on each curved road, as indicated by a thick line in FIG. 7.

In step S34, the ECU 10 determines whether fixed time interval processing is completed. If the ECU 10 determines in this step that the fixed time interval processing has not been completed, the ECU 10 divides the target traveling path into a plurality of regions C at fixed or evenly spaced infinitesimal time intervals in step S35. Then, the ECU 10 creates an array of coordinates of respective points placed in the plurality of regions C into which the target traveling path is divided. Subsequently, in step S36, the ECU 10 creates a plurality of arrays of the turning radius R relative to the time from the running start point and the time interval, in the plurality of regions C into which the target traveling path is divided.

Although not illustrated in FIG. 2, after execution of step S36, the operation to calculate the maximum speed V of the vehicle in each division region according to the equation of motion, using the turning radius R of the road and the coefficient of friction µ between the tires and the road surface, as in step S17 as described above, the operation to determine whether the maximum speed V of the vehicle has been calculated for all of the division regions of the target traveling path in step S18, and the operation to create a steady-state circle maximum speed pattern in step S19 are performed.

Subsequently, the ECU 10 calculates an acceleration across two adjacent points set in sequence in a direction from the running start point to the running end point, with respect to the created steady-state circle maximum speed pattern of the target traveling path, in similar manners to those of steps S20-S26. Then, in similar manners to those of steps S27-S33, the ECU 10 calculates a deceleration across two adjacent points set in sequence in a direction from the running end point to the running start point, with respect to the steady-state circle maximum speed pattern of the target traveling path.

Subsequently, the ECU 10 determines in step S34 whether the fixed time interval processing is completed. If the ECU 10 determines that the fixed time interval processing is completed, the process of FIG. 2 ends. The ECU 10 may repeatedly perform the fixed time interval processing a plurality of time as needed.

The vehicle running control system 1 of the first embodiment is configured to create a speed pattern according to the target traveling path, and control running of the vehicle based on the speed pattern, and includes the first speed condition correcting unit that performs an operation to correct speed conditions from the start position of running control toward the end position of running control on the target traveling path, and the second speed condition correcting unit that performs an operation to correct speed conditions from the end position of running control toward the start position of running control on the target traveling path.

Accordingly, the vehicle running control system 1 corrects speed conditions from the start position to the end position of running control on the target traveling path, and also corrects speed conditions from the end position to the start position of running control, without using the optimization method, so as to create a speed pattern corresponding to the traveling path within a short time, and permit adequate running control of the vehicle based on the speed pattern.

In the vehicle running control system 1 of the first embodiment, the ECU 10 serving as the first speed condition correcting unit and the second speed condition correcting unit performs an operation to correct acceleration-side speed conditions, and also performs an operation to correct deceleration-side speed conditions. In this case, the ECU 10 corrects the speed conditions to lower speeds. Thus, the processing can be simplified by performing the operation to correct acceleration-side speed conditions and the operation to correct deceleration-side speed conditions independently of each other, and correcting the speed conditions to lower speeds.

The vehicle running control system 1 of the first embodiment includes the traveling path dividing unit that divides the target traveling path into a plurality of regions C at fixed or given intervals, and the ECU 10 performs an operation to correct a speed condition for each of the regions C, compares the speed conditions of adjacent ones of the regions C, and corrects the speed condition of the higher-speed region C to a lower speed. In this case, the ECU 10 compares the speeds of the adjacent regions C, and performs a correcting operation so as to prevent the acceleration or deceleration from exceeding the upper limit. Thus, the target traveling path is divided into a plurality of regions at fixed intervals, and the operation to correct the speed condition to a lower speed is performed for each of the regions C, so that the speed conditions can be corrected with high accuracy.

In the first embodiment as described above, with respect to the steady-state circle maximum speed pattern of the target traveling path, the acceleration across adjacent points set in sequence in a direction from the running start point to the running end point is calculated, and then the deceleration across adjacent points set in sequence in a direction from the running end point to the running start point is calculated. However, with respect to the steady-state circle maximum speed pattern of the target traveling path, the deceleration across adjacent points set in sequence in a direction from the running end point to the running start point may be first calculated, and then the acceleration across adjacent points set in sequence in a direction from the running start point to the running end point may be calculated.

Figure 9:
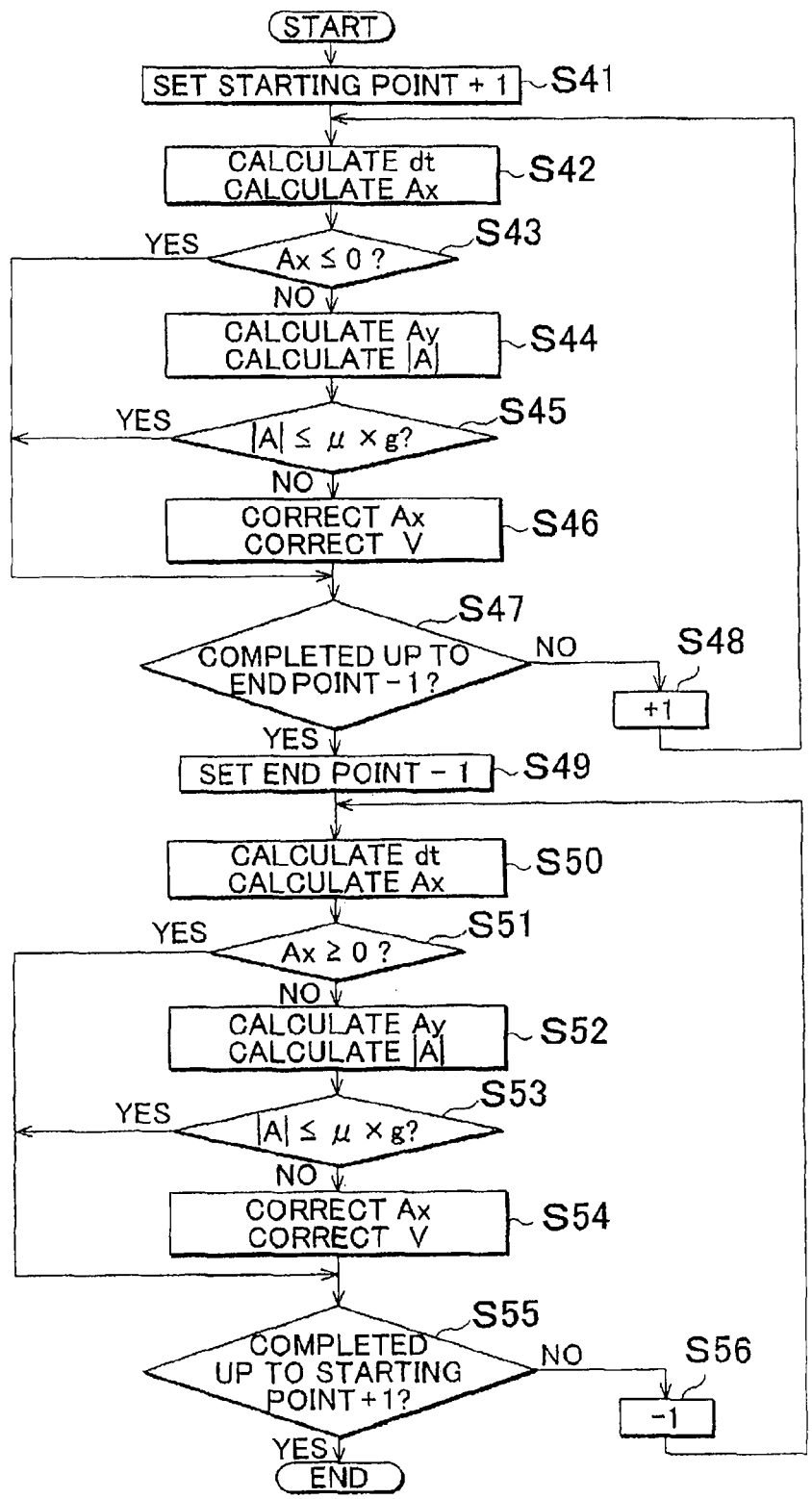
FIG. 9 is a flowchart illustrating a process of creating a speed pattern according to a traveling path, which is executed by a vehicle running control system according to a second embodiment of the invention.

FIG. 9 is a flowchart illustrating a process of creating a speed pattern according to a traveling path, which is executed by a vehicle running control system 1 according to a second embodiment of the invention. The overall configuration of the vehicle running control system 1 of this embodiment is substantially the same as that of the first embodiment as described above, and will be described with reference to FIG. 1. Also, the same reference numerals as used in the first embodiment are assigned to members or components having the same or similar functions as those of the first embodiment, and explanation of these members or components will not be repeated.

In the vehicle running control system 1 of the second embodiment, the first speed condition correcting unit and the second speed condition correcting unit calculate an addition vector of the acceleration or deceleration across adjacent regions C and the lateral acceleration, and performs a speed correcting operation based on the addition vector and a friction circle set for each region. More specifically, the first speed condition correcting unit and second speed condition correcting unit correct the speeds of the adjacent regions to lower speeds, so that the addition vector does not go beyond the friction circle of each region.

Described more specifically, the vehicle running control system 1 of the second embodiment has a process to be carried out subsequently to the process of creating a speed pattern in the first embodiment as described above. Namely, if the target traveling path is a curved traveling path along which the turning radius R changes gently or at a low rate, like an expressway, a speed pattern can be adequately created through the speed pattern creating process of the first embodiment. In this case, the maximum speed changes slowly in the speed pattern. On the other hand, if the target traveling path is a curved traveling path along which the turning radius R abruptly changes, the acceleration or deceleration during running along the curve increases, and addition of vectors of the longitudinal acceleration and lateral acceleration may result in breakdown of the friction circle. Therefore, when the sum of a vector of acceleration or deceleration and a vector of lateral acceleration goes beyond the friction circle, the vehicle running control system 1 of the second embodiment reduces the acceleration or deceleration so that the sum of the vectors falls within the friction circle.

Once a speed pattern of the target traveling path is created, as in the first embodiment, the ECU 10 initially adds an acceleration (vector) and a lateral acceleration (vector) across adjacent points set in sequence in a direction from the running start point to the running end point. If the sum of the vectors goes beyond the friction circle, the ECU 10 corrects the speed of one of the adjacent points having the higher speed and located closer to the running end point, to a lower speed, so that the addition vector of the accelerations lies within the friction circle.

Also, the ECU 10 adds a deceleration (vector) and a lateral acceleration (vector) across adjacent points set in sequence in a direction from the running end point to the running start point. If the sum of the vectors goes beyond the friction circle, the ECU 10 corrects the speed of one of the adjacent points having the higher speed and located closer to the running start point, to a lower speed, so that the addition vector of the accelerations lies within the friction circle.

The optimum method of avoiding going beyond the friction circle, more specifically, which of the acceleration and the lateral acceleration is to be reduced by what degree, depends on detailed running conditions of the vehicle, and the above-mentioned process may not be optimal. In this embodiment, however, the speed is ultimately reduced and the lateral vector is reduced, at adjacent points where the acceleration or deceleration is limited. As a result, the acceleration or deceleration across adjacent points can be reduced; therefore, a substantially optimum speed pattern is created with respect to a target traveling path along which the turning radius R abruptly changes, even though it is high-speed processing.

A process of creating a speed pattern according to a traveling path, which is executed by the vehicle running control system 1 of the second embodiment, will be described in detail with reference to the flowchart of FIG. 9.

In the process of creating a speed pattern according to a traveling path with the vehicle running control system 1 of the second embodiment, after the speed pattern creating process (the flowchart of FIG. 2) of the first embodiment is completed, the process as shown in FIG. 9 is carried out. In step S41 to step S48, the ECU 10 corrects the maximum speed based on an addition vector across adjacent points set in sequence in a direction from the running start point to the running end point, with respect to the speed pattern of the target traveling path. Namely, the ECU 10 sets a region that is advanced by one region from the running start point toward the running end point in step S41, and calculates a pass time $dt_n$ in step S42, based on a distance $L_n$ between two points of the maximum speed $V_n$ of this region (the running start point+1) $C_n$ and the maximum speed $V_{n-1}$ of a region $C_{n-1}$ located ahead of the region $C_n$, according to the following equation.

$$dt_n = L_n/((V_{n-1}+V_n)/2)$$

Then, the acceleration $Ax_n$ at this time is calculated according to the following equation.

$$Ax_n = (V_n - V_{n-1})/dt_n$$

In step S43, the ECU 10 determines whether the acceleration $Ax_n$ is equal to or smaller than 0. If it is determined in step S43 that the acceleration $Ax_n$ is equal to or smaller than 0, the control proceeds to step S47. On the other hand, if it is determined that the acceleration $Ax_n$ is larger than 0, the ECU 10 proceeds to step S44 to extract the turning radius R at each point, and calculate the lateral acceleration $Ay_n$ according to the following equation.

$$AY_n = ((V_{n-1}+V_n)/2)^2/R$$

Subsequently, an absolute value |A| of an acceleration addition vector is calculated according to the following equation, by adding vectors of the acceleration $Ax_n$ and lateral acceleration $Ay_n$ together: $|A|=\mathrm{sqrt}(Ax_n^2+Ay_n^2)$, where sqrt represents square root.

In step S45, the ECU 10 determines whether the absolute value |A| of the acceleration addition vector is equal to or smaller than the maximum acceleration $A_{max}$ (coefficient of friction μ×gravitational acceleration g) of the friction circle as the upper limit. If it is determined in step S45 that the absolute value |A| of the acceleration addition vector is equal to or smaller than the maximum acceleration $A_{max}$ as the upper limit, it is presumed that the acceleration will not go beyond the friction circle, and the control proceeds to step S47. On the other hand, if it is determined in step S46 that the absolute value |A| of the acceleration addition vector is larger than the maximum acceleration $A_{max}$, it is presumed that the acceleration will go beyond the friction circle, and the ECU 10 corrects the acceleration $Ax_n$ and the maximum speed $V_n$ in step S46, according to the following equations.

$$Ax_n = \mathrm{sqrt}(\mu \times g)^2 - Ay_n^2$$

$$V_n = (V_{n-1}+Ax_n \times dt_n)$$

Namely, when the addition vector goes beyond the friction circle, the ECU 10 corrects the speed at one of the adjacent points having the higher speed and located closer to the running end point, to a lower speed, so that the addition vector does not go beyond the friction circle.

The ECU 10 determines in step S47 whether the operation to correct the maximum speed $V_n$ is completed over a range from the point following the running start point to a point located ahead of the running end point. If it is determined in step S47 that the operation to correct the maximum speed $V_n$ has not been completed with respect to all of the regions, the ECU 10 sets a region C that is advanced by one region from the region (point) C that has been processed toward the running end point, and repeats the process of steps S42 to S47. If it is determined in step S47 that the operation to correct the maximum speed $V_n$ is completed over the range from the point following the running start point to the point ahead of the running end point, the control proceeds to step S49.

In steps S49 to S56, the ECU 10 corrects the maximum speed based on the addition vector across adjacent points set in sequence in a direction from the running end point toward the running start point, with respect to the steady-state circle maximum speed pattern of the target traveling path. Namely, the ECU 10 sets a region that is retracted by one region from the running end point toward the running start point in step S49, and calculates a pass time $dt_n$ in step S50, from a distance $L_n$ between two points of the maximum speed $V_n$ of this region (the running end point−1) $C_n$ and the maximum speed $V_{n+1}$ of the region $C_{n+1}$ located ahead of the region $C_{n+1}$, according to the following equation.

$$dt_n = L_n/((V_n+V_{n+1})/2)$$

Subsequently, the deceleration $Ax_n$ is calculated according to the following equation.

$$Ax_n = (V_{n+1}-V_n)/dt_n$$

In step S51, the ECU 10 determines whether the deceleration $Ax_n$ is equal to or larger than 0. If it is determined in step S51 that the deceleration $Ax_n$ is equal to or larger than 0, the control proceeds to step S55. On the other hand, if it is determined that the deceleration $Ax_n$ is smaller than 0, the ECU 10 proceeds to step S52 to extract the turning radius R at each point, and calculate the lateral acceleration $Ay_n$ according to the following equation.

$$Ay_n = ((V_{n+1}+V_n)/2)^2/R$$

Subsequently, an absolute value |A| of a deceleration addition vector is calculated according to the following equation, by adding a vector of the deceleration $Ax_n$ and a vector of the lateral acceleration $Ay_n$.

$$|A| = \mathrm{sqrt}(Ax_n^2 + Ay_n^2)$$

In step S53, the ECU 10 determines whether the absolute value |A| of the deceleration addition vector is equal to or smaller than the maximum acceleration $A_{max}$ (coefficient of friction μ×gravitational acceleration g) of the friction circle as the upper limit. If it is determined in step S53 that the absolute value |A| of the deceleration addition vector is equal to or smaller than the maximum acceleration $A_{max}$ as the upper limit, it is presumed that the acceleration will not go beyond the friction circle, and the control proceeds to step S55. On the other hand, if it is determined that the absolute value |A| of the deceleration addition vector is larger than the maximum acceleration $A_{max}$, it is presumed that the acceleration will go beyond the friction circle, and the ECU 10 corrects the deceleration $Ax_n$ and the maximum speed $V_n$ in step S54, according to the following equations.

$$Ax_n = \text{sqrt}(\mu \times g)^2 - Ay_n^2$$

$$V_n = (V_{n+1} + Ax_n \times dt_n)$$

Namely, when the addition vector goes beyond the friction circle, the ECU 10 corrects the speed at one of the adjacent points having the higher speed and located closer to the running start point, to a lower speed, so that the addition vector does not go beyond the friction circle.

The ECU 10 determines in step S55 whether the operation to correct the maximum speed $V_n$ is completed over a range from a point ahead of the running end point to a point following the running start point. If it is determined in step S55 that the operation to correct the maximum speed $V_n$ has not been completed with respect to all of the regions C, the ECU 10 sets a region C that is retracted by one region from the region (point) C that has been processed toward the running start point, and repeats the process of steps S50-S55. If it is determined in step S55 that the operation to correct the maximum speed $V_n$ is completed over the range from the point ahead of the running end point to the point following the running start point, the process of FIG. 9 ends.

Thus, in the vehicle running control system 1 of the second embodiment, the ECU 10 calculates an addition vector of the acceleration or deceleration across adjacent regions and the lateral acceleration, and corrects the speed based on the addition vector and the friction circle of each region C. More specifically, the ECU 10 corrects the speed of one of the adjacent regions, to a lower speed, so that the addition vector does not go beyond the friction circle of each region.

Accordingly, even in a region of the target traveling path in which there are large variations in the turning radius, it is possible to improve the safety by setting the maximum speed so as not to go beyond the friction circle.

Figure 10A:
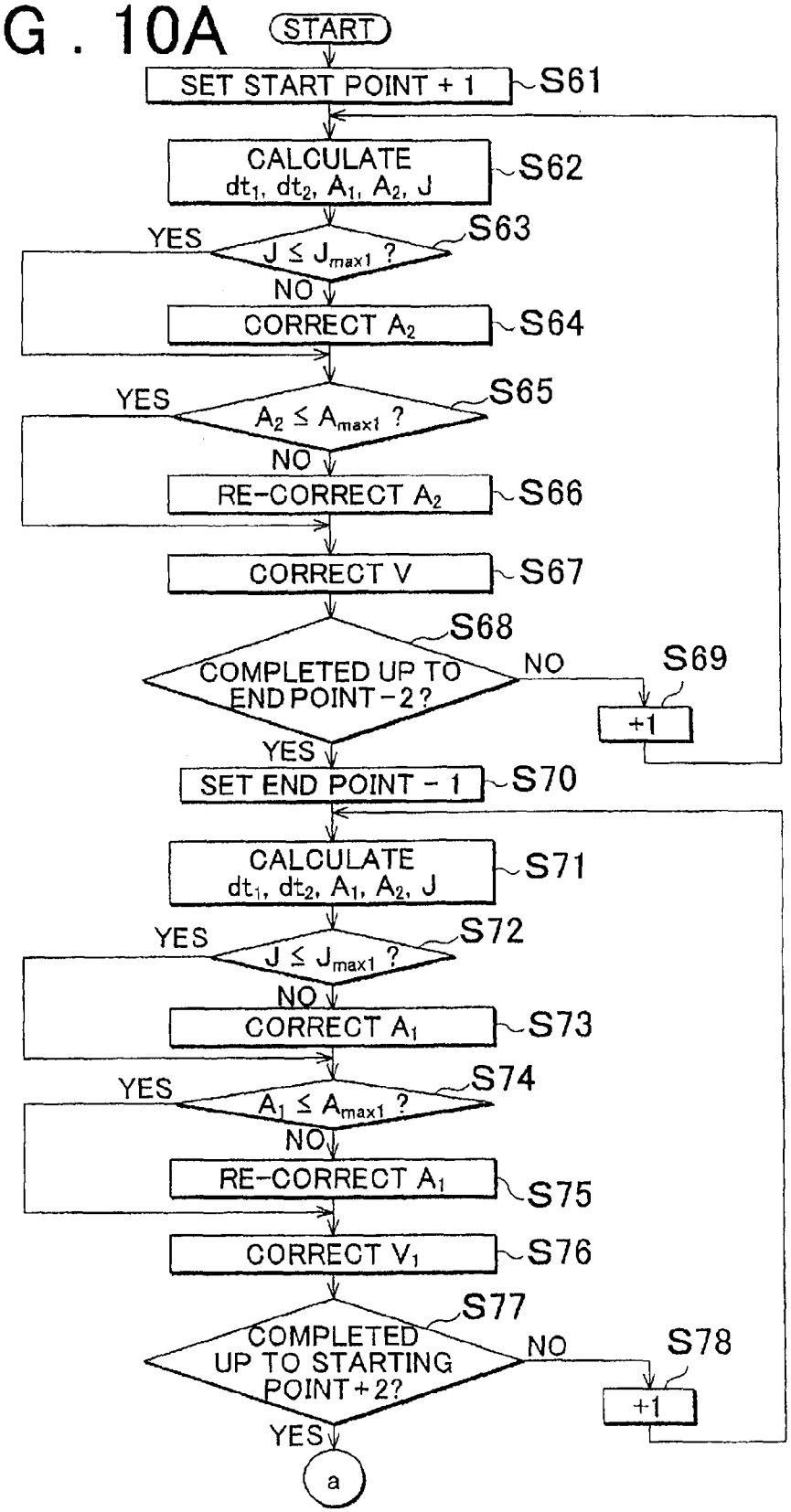
FIG. 10A is a flowchart illustrating a process of creating a speed pattern according to a traveling path, which is executed by a vehicle running control system according to a third embodiment of the invention.
Figure 10B:
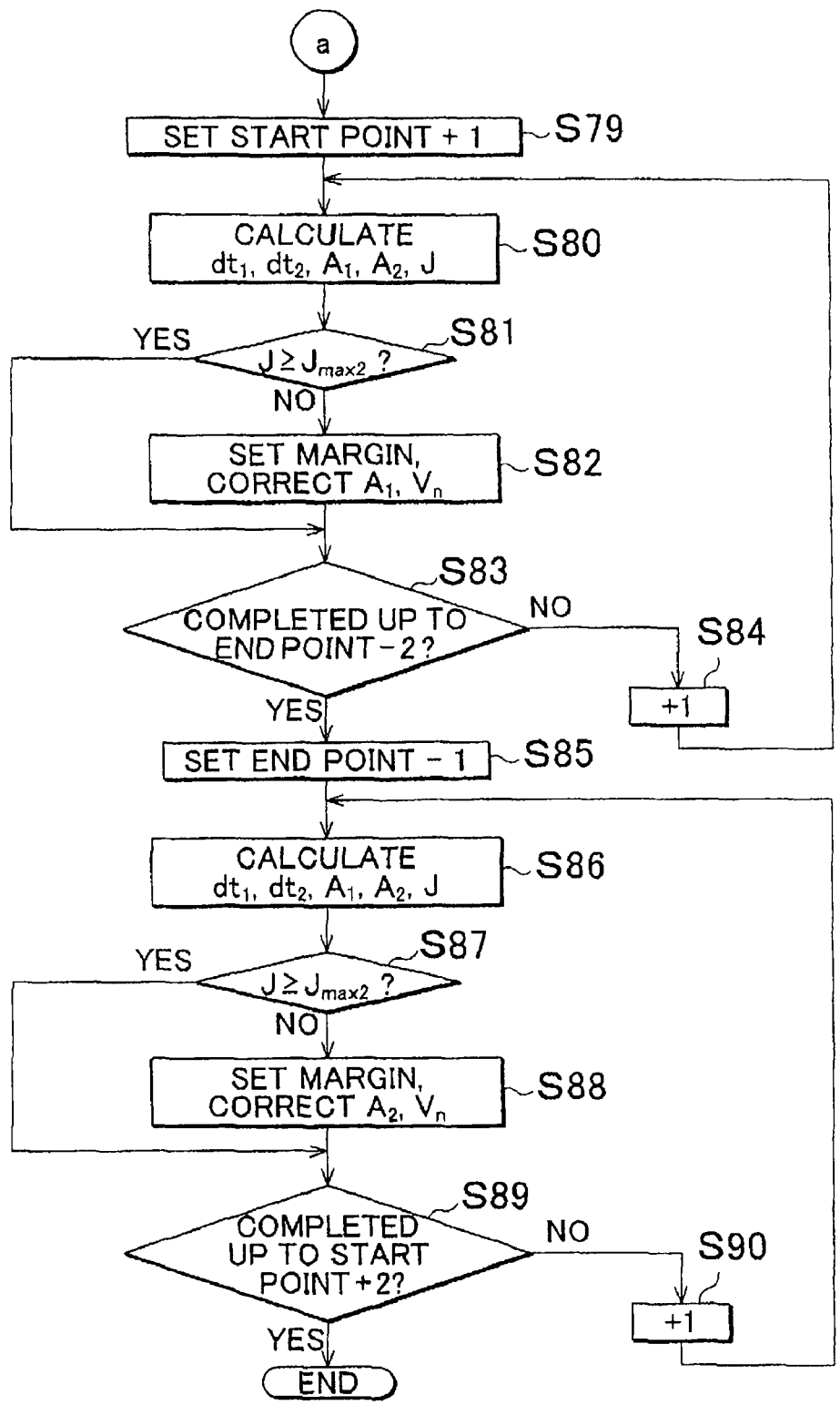
FIG. 10B is a flowchart illustrating the process of creating a speed pattern according to a traveling path, which is executed by the vehicle running control system according to the third embodiment of the invention.
Figure 11:
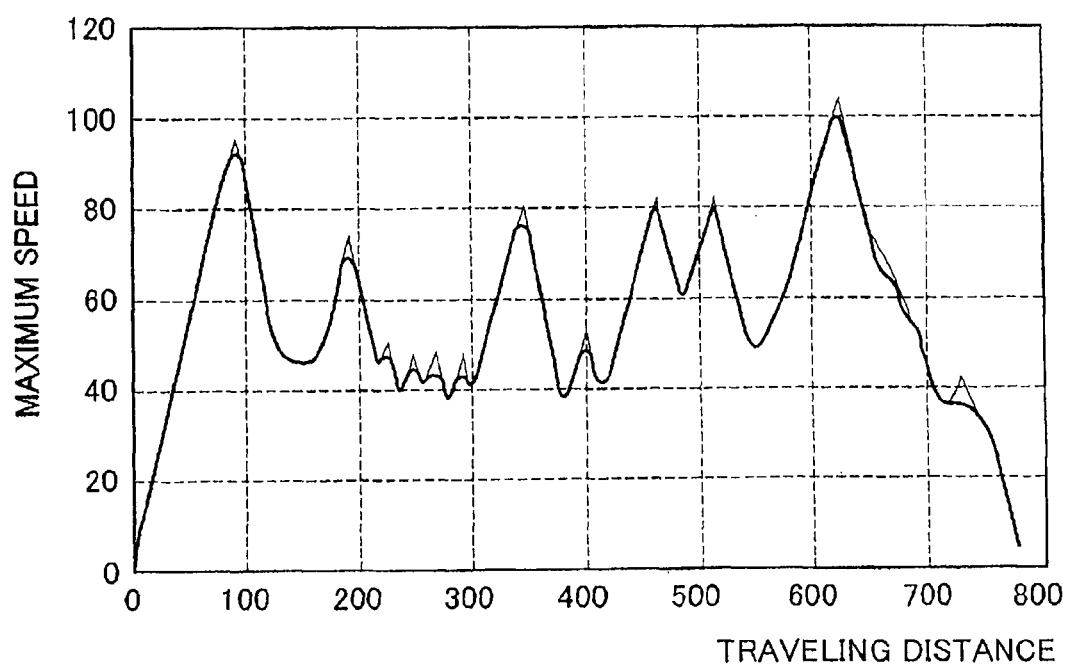
FIG. 11 is a graph indicating a speed pattern to which jerk correction is made on the traveling course.
Figure 12A:
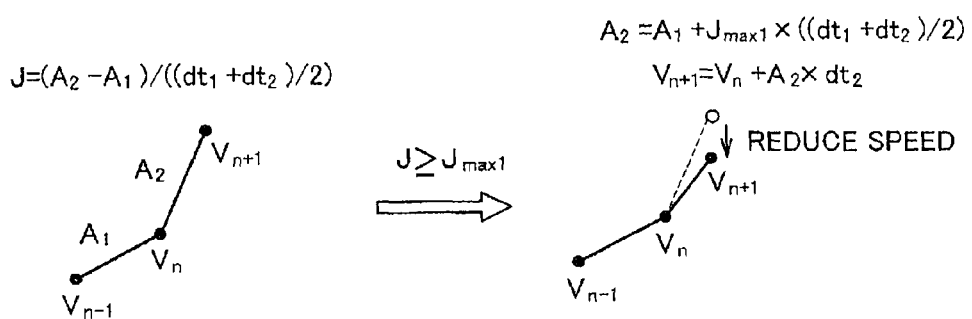
FIG. 12A is an explanatory view showing jerk correction made to the speed pattern.
Figure 12B:
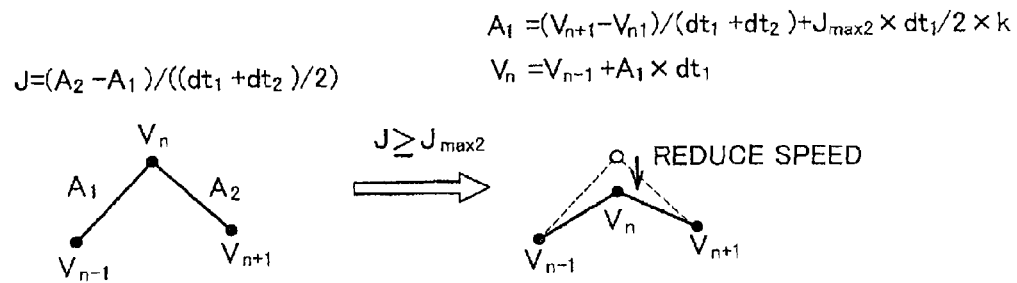
FIG. 12B is an explanatory view showing jerk correction made to the speed pattern.

FIG. 10A and FIG. 10B are flowcharts illustrating a process of creating a speed pattern according to a traveling path, which is executed by a vehicle running control system 1 according to a third embodiment of the invention, and FIG. 11 is a graph showing a speed pattern to which corrections concerning jerks on a traveling course are made. FIG. 12A is a view useful for explaining jerk correction made to the speed pattern, and FIG. 12B is a view useful for explaining jerk correction made to the speed pattern. The overall configuration of the vehicle running control system 1 of this embodiment is substantially the same as that of the first embodiment as described above, and will be described with reference to FIG. 1. Also, the same reference numerals as used in the first embodiment are assigned to members or components having the same or similar functions as those of the first embodiment, and explanation of these members or components will not be repeated.

In the vehicle running control system 1 of the third embodiment, the first speed condition correcting unit and the second speed condition correcting unit calculate a jerk (or rate of change of acceleration) across adjacent regions, and compare the jerk with predetermined upper limit and lower limit (limit values), so as to perform a speed correcting operation.

In this case, when changes in the speed across three adjacent regions C assume a recessed or concave shape (or a convex shape as viewed from the top), the first speed condition correcting unit and second speed condition correcting unit correct a speed condition of one of the regions C having the highest speed and located at the leading side as viewed in the direction of progression of the correcting operation, to a lower speed. Also, when changes in the speed across three adjacent regions C assume a convex shape (or a concave shape as viewed from the bottom), the first speed condition correcting unit and second speed condition correcting unit correct a speed condition of an intermediate region having the highest speed, to a lower speed.

Described more specifically, the vehicle running control system 1 of the third embodiment has a process to be carried out subsequently to the process of creating a speed pattern in the first embodiment or second embodiment as described above. Namely, the vehicle running control system 1 of the first or second embodiment regards the vehicle as one mass point when performing the speed pattern creating process; therefore, when the vehicle that has been fully accelerated is fully decelerated at a point immediately ahead of a curved path, a speed pattern is created in which the target maximum speed changes instantaneously from the maximum acceleration to the maximum deceleration. During running of the actual vehicle, however, the vehicle undergoes pitching if the above-described running control is performed, and the posture of the vehicle may become unstable or lost.

Therefore, the vehicle running control system 1 of the third embodiment calculates the jerk (i.e., the rate of change of acceleration), so as to take account of the maximum speed of response and ride comfort of the vehicle, while setting the upper limit and lower limit of the jerk, and corrects the speed pattern so that the jerk falls within a range between the jerk upper limit and the jerk lower limit.

Once a speed pattern of the target traveling path is created, the jerk (i.e., the rate of change of acceleration) across three points set in sequence in a direction from the running start point to the running end point is calculated. If the jerk exceeds the jerk upper limit, the speed of one of the three points which is closest to the running end point is corrected to a lower speed (i.e., reduced) so that the jerk across the three points becomes smaller than the jerk upper limit. Through this operation, speed correction can be made with high efficiency in the region where changes in the speed over three points assume a concave or recessed shape and where the acceleration across the region is positive (+).

Also, the jerk (i.e., the rate of change of acceleration) across three points set in sequence in a direction from the running end point to the running start point is calculated. If the jerk exceeds the jerk upper limit, the speed of one of the three points which is closest to the running start point is corrected to a lower speed (i.e., reduced) so that the jerk across the three points becomes smaller than the jerk upper limit. Through this operation, speed correction can be made with high efficiency in the region where changes in the speed over three points assume a concave or recessed shape and where the acceleration across the region is negative (−).

Subsequently, the jerk (i.e., the rate of change of acceleration) across three adjacent points set in sequence in the direction from the running start point to the running end point is calculated again. If the jerk is smaller than the jerk lower limit, the speed of the middle point of the three points is corrected to a lower speed (i.e., reduced) so that the jerk across the three points becomes larger than the jerk lower limit. Through this operation, speed correction can be made with high efficiency in the region where changes in the speed over three points assume a convex shape and where the acceleration across the region is positive (+).

Also, the jerk (i.e., the rate of change of acceleration) across three adjacent points set in sequence in the direction from the running end point to the running start point is calculated. If the jerk is smaller than the jerk lower limit, the speed of the middle point of the three points is corrected to a lower speed (i.e., reduced) so that the jerk across the three points becomes larger than the jerk lower limit. Through this operation, speed correction can be made with high efficiency in the region where changes in the speed over three points assume a convex shape and where the acceleration across the region is negative (−).

During the second scanning from the running start point to the running end point and the second scanning from the running end point to the running start point, the speed of the middle point of the three adjacent points is corrected. Therefore, the speed of one of the three points located at the leading end in the scanning direction, namely, the speed of the point closest to the running start point in the scanning from the running start point to the running end point, or the speed of the point closest to the running end point in the scanning from the running end point to the running start point, is not corrected. In this case, the jerk may not become larger than the jerk lower limit through one scanning operation. Therefore, a margin α (e.g., 10%) may be added to the jerk lower limit, so as to speed up control of the jerk within the above limits. Since errors are more likely to occur to highly accurate values as the margin α is larger, it is necessary to adequately set the margin α in view of the processing time and the control accuracy. In some cases, the acceleration(s) resulting from the correcting operation of this embodiment may exceed the upper-limit acceleration used in the first embodiment; therefore, the correcting operation of this embodiment using the jerk needs to be performed in view of the upper-limit acceleration used in the first embodiment.

A process of creating a speed pattern according to a traveling path, which is executed by the vehicle running control system 1 of the third embodiment, will be described in detail with reference to the flowcharts of FIG. 10A and FIG. 10B.

In the process of creating a speed pattern according to a traveling path with the vehicle running control system 1 of the third embodiment, once the speed pattern creating process (the flowchart of FIG. 2) of the first embodiment is completed, the process as shown in FIG. 10A is carried out. In steps S61-S69, the ECU 10 corrects the maximum speed in the speed pattern of the target traveling path, based on the jerk across three adjacent points set in sequence in the direction from the running start point to the running end point. Through this operation, speed correction can be made with high efficiency in each region where speed changes over three points assume a concave or recessed shape and where the acceleration across the region is negative (−).

Namely, the ECU 10 sets a region C that is advanced by one region from the running start point toward the running end point in step S61, and calculates pass times $dt_1$, $dt_2$ in step S62, based on distances $L_1$, $L_2$ among the points of the maximum speed $V_n$ of this region $C_n$ (the running start point+1), the maximum speed $V_{n-1}$ of a region $C_{n-1}$ located ahead of the region $C_n$, and the maximum speed $V_{n+1}$ of a region $C_{n+1}$ located behind the region $C_n$, according to the following equations.

$$dt_1 = L_1/((V_{n-1}+V_n)/2)$$

$$dt_2 = L_2/((V_n+V_{n+1})/2)$$

Subsequently, the accelerations $A_1$, $A_2$ at this time are calculated according to the following equations.

$$A_1 = (V_n - V_{n-1})/dt_1$$

$$A_2 = (V_{n+1} - V_n)/dt_2$$

Furthermore, the jerk (the rate of change of acceleration) J at this time is calculated according to the following equation.

$$J = (A_2 - A_1)/((dt_1+dt_2)/2)$$

The ECU 10 determines in step S63 whether the jerk J is equal to or smaller than the upper-limit jerk $J_{max1}$ (for example, 6 m/s³). If it is determined in step S63 that the jerk J is equal to or smaller than the upper-limit jerk $J_{max1}$, a jerk limiting condition is satisfied; therefore, the control proceeds to step S65. If, on the other hand, it is determined that the jerk J is larger than the upper-limit jerk $J_{max1}$, the ECU 10 corrects the acceleration $A_2$ according to the following equation, so as to satisfy the jerk limiting condition.

$$A_2 = A_1 + J_{max1} \times ((dt_1+dt_2)/2)$$

In step S65, the ECU 10 determines whether the acceleration $A_2$ is equal to or smaller than the upper-limit acceleration $A_{max1}$ extracted from a map (indicating the relationship between the maximum speed set in accordance with the vehicle performance and the upper-limit acceleration). If it is determined in step S65 that the acceleration $A_2$ is equal to or smaller than the upper-limit acceleration $A_{max1}$, the control proceeds to step S67. On the other hand, if it is determined that the acceleration $A_2$ is larger than the upper-limit acceleration $A_{max1}$, the ECU 10 re-correct the acceleration $A_2$ so that the upper-limit acceleration $A_{max1}$ is set as the acceleration $A_2$. In the case where it is impossible to achieve the acceleration set based on the jerk, the upper-limit acceleration $A_{max1}$ set according to the vehicle performance is prioritized over the acceleration $A_2$ set based on the jerk.

In step S67, the ECU 10 corrects the maximum speed $V_{n+1}$ according to the following equation.

$$V_{n+1} = V_n + A_2 \times dt_2$$

Namely, when the jerk exceeds the upper limit, the ECU 10 corrects the speed of one of the three adjacent points having the highest speed and located closest to the running end point, to a lower speed.

In step S68, the ECU 10 determines whether the operation to correct the maximum speed $V_n$ is completed over a range from a point following the running start point to a point located ahead of the running end point with two regions interposed therebetween. If it is determined that the operation to correct the maximum speed $V_n$ has not been completed with respect to all of the regions, the ECU 10 sets a region C that is advanced by one region from the region (point) that has been processed toward the running end point in step S69, and repeats the process of steps S62-S68. Then, if it is determined in step S68 that the operation to correct the maximum speed $V_n$ is completed over the range from the point following the running start point to the point located ahead of the running end point with two regions interposed therebetween, the control proceeds to step S70.

The operation to correct the maximum speed by using the jerk calculated in sequence in the direction from the running start point to the running end point will be described in greater detail. As shown in FIG. 12A, when a point of the maximum speed $V_n$, a point of the maximum speed $V_{n-1}$ located ahead of the point of $V_n$, and a point of the maximum speed $V_{n+1}$ located behind the point of $V_n$ are given or set, a jerk J across these three points is calculated. If the jerk J is larger than the upper-limit jerk $J_{max1}$, the ECU 10 corrects the maximum speed $V_{n+1}$. In this case, the ECU 10 corrects the maximum speed $V_{n+1}$, i.e., the speed of the point having the highest speed and located closest to the running end point, to a lower speed.

In steps S70-S77, the ECU 10 corrects the maximum speed based on the jerk across three adjacent points set in sequence in the direction from the running end point to the running start point, with respect to the speed pattern of the target traveling path. Through this operation, speed correction can be made with high efficiency in each region where speed changes over three points assume a concave or recessed shape and where the acceleration across the region is negative (−).

Namely, the ECU 10 sets a region C that is retracted by one region from the running end point toward the running start point in step S70, and calculates pass times $dt_1$, $dt_2$ in step S71, based on distances $L_1$, $L_2$ among the respective points of the maximum speed $V_n$ of this region $C_n$ (the running end point−1), the maximum speed $V_{n-1}$ of a region $C_{n+1}$ located ahead of the region $C_n$, and the maximum speed $V_{n-1}$ of a region $C_{n-1}$ located behind the region $C_n$, according to the following equations.

$$dt_1 = L_1/((V_{n-1}+V_n)/2)$$

$$dt_2 = L_2/((V_n+V_{n+1})/2)$$

Subsequently, the accelerations $A_1$, $A_2$ at this time are calculated according to the following equations.

$$A_1 = (V_n - V_{n-1})/dt_1$$

$$A_2 = (V_{n+1} - V_n)/dt_2$$

Furthermore, the jerk (the rate of change of acceleration) J at this time is calculated according to the following equation.

$$J = (A_2 - A_1)/((dt_1 + dt_2)/2)$$

The ECU 10 determines in step S72 whether the jerk J is equal to or smaller than the upper-limit jerk $J_{max1}$. If it is determined in step S72 that the jerk J is equal to or smaller than the upper-limit jerk $J_{max1}$, the jerk limiting condition is satisfied; therefore, the control proceeds to step S74. If, on the other hand, it is determined that the jerk J is larger than the upper-limit jerk $J_{max1}$, the ECU 10 corrects the acceleration $A_1$ in step S73 according to the following equation, so as to satisfy the jerk limiting condition.

$$A_1 = A_2 - J_{max1} \times ((dt_1 + dt_2)/2)$$

In step S74, the ECU 10 determines whether the acceleration $A_1$ is equal to or smaller than the upper-limit acceleration $A_{max1}$. If it is determined in this step that the acceleration $A_1$ is equal to or smaller than the upper-limit acceleration $A_{max1}$, the control proceeds to step S76. On the other hand, if it is determined that the acceleration $A_1$ is larger than the upper-limit acceleration $A_{max1}$, the ECU 10 re-correct the acceleration $A_1$ so that the upper-limit acceleration $A_{max1}$ is set as the acceleration $A_1$. In the case where it is impossible to achieve the acceleration set based on the jerk, the upper-limit acceleration $A_{max1}$ set according to the vehicle performance is prioritized over the acceleration $A_1$ set based on the jerk.

In step S76, the ECU 10 corrects the maximum speed $V_{n-1}$ according to the following equation.

$$V_{n-1} = V_n - A_1 \times dt_1$$

Namely, when the jerk exceeds the upper limit, the ECU 10 corrects the speed of one of the three adjacent points having the highest speed and located closest to the running start point, to a lower speed.

In step S77, the ECU 10 determines whether the operation to correct the maximum speed $V_n$ is completed over a range from the point located ahead of the running end point to the second point as counted from the running start point. If it is determined that the operation to correct the maximum speed $V_n$ has not been completed with respect to all of the regions, the ECU 10 sets a region C that is retracted by one region from the region (point) that has been processed toward the running start point in step S78, and repeats the process of steps S70-S77. Then, if it is determined in step S77 that the operation to correct the maximum speed $V_n$ is completed over the range from the point located ahead of the running end point to the second point as counted from the running start point, the control proceeds to step S79.

As shown in FIG. 10B, in steps S79-S83, the ECU 10 corrects the maximum speed based on the jerk across three adjacent points set in sequence in the direction from the running start point to the running end point, with respect to the speed pattern of the target traveling path. Through this operation, speed correction can be made with high efficiency in each region where speed changes over three points assume a convex shape and where the acceleration across the region is positive (+).

Namely, the ECU 10 sets a region C that is advanced by one region from the running start point toward the running end point in step S79, and calculates pass times $dt_1$, $dt_2$ in step S80, based on distances $L_1$, $L_2$ among the respective points of the maximum speed $V_n$ of this region $C_n$ (the running start point+1), the maximum speed $V_{n-1}$ of a region $C_{n-1}$ located ahead of the region $C_n$, and the maximum speed $V_{n+1}$ of a region $C_{n+1}$ located behind the region $C_n$, according to the following equations.

$$dt_1 = L_1/((V_{n-1}+V_n)/2)$$

$$dt_2 = L_2/((V_n+V_{n+1})/2)$$

Subsequently, the accelerations $A_1$, $A_2$ at this time are calculated according to the following equations.

$$A_1 = (V_n - V_{n-1})/dt_1$$

$$A_2 = (V_{n+1} - V_n)/dt_2$$

Furthermore, the jerk (the rate of change of acceleration) J at this time is calculated according to the following equation.

$$J = (A_2 - A_1)/((dt_1 + dt_2)/2)$$

The ECU 10 determines in step S81 whether the jerk J is equal to or larger than the lower-limit jerk $J_{max2}$ (for example, −6 m/s³). If it is determined in step S81 that the jerk J is equal to or larger than the lower-limit jerk $J_{max2}$, a jerk limiting condition is satisfied; therefore, the control proceeds to step S83. If, on the other hand, it is determined that the jerk J is smaller than the lower-limit jerk $J_{max2}$, the ECU 10 sets a margin coefficient k (e.g., 0.9) for the jerk lower limit in step S82, so as to speed up control of the jerk J within the limits. Then, the ECU 10 corrects the acceleration $A_1$ and the maximum speed $V_n$ according to the following equations, so as to satisfy the jerk limiting condition.

$$A_1 = (V_{n+1} - V_{n-1})/(dt_1 + dt_2) + J_{max2} \times dt_1/2 \times k$$

$$V_n = V_{n-1} + A_1 \times dt_1$$

Namely, when the jerk is smaller than the lower limit, the ECU 10 corrects the speed of the middle one of the three adjacent points which has the highest speed, to a lower speed.

In step S83, the ECU 10 determines whether the operation to correct the maximum speed $V_n$ is completed over the range from the point following the running start point to the point located ahead of the running end point with two regions interposed therebetween. If it is determined that the operation to correct the maximum speed $V_n$ has not been completed with respect to all of the regions, the ECU 10 sets a region C that is advanced by one region from the region (point) C that has been processed toward the running end point, in step S84, and repeats the process of steps S79-S82. Then, if it is determined in step S83 that the operation to correct the maximum speed $V_n$ is completed over the range from the point following the running start point to the point located ahead of the running end point with two regions interposed therebetween, the control proceeds to step S85.

The operation to correct the maximum speed by using the jerk calculated in sequence in the direction from the running start point to the running end point will be described in greater detail. As shown in FIG. 12B, when a point of the maximum speed $V_n$, a point of the maximum speed $V_{n-1}$ located ahead of the point of $V_n$, and a point of the maximum speed $V_{n+1}$ located behind the point of $V_n$ are given or set, a jerk J across these three points is calculated. If the jerk J is smaller than the lower-limit jerk $J_{max2}$, the ECU 10 corrects the maximum speed $V_n$. In this case, the ECU 10 corrects the maximum speed $V_n$, i.e., the speed of the middle point having the highest speed, to a lower speed.

In steps S85-S89, the ECU 10 corrects the maximum speed based on the jerk across three adjacent points set in sequence in the direction from the running end point to the running start point, with respect to the speed pattern of the target traveling path. Through this operation, speed correction can be made with high efficiency in each region where speed changes over three points assume a convex shape and where the acceleration across the region is negative (−).

Namely, the ECU 10 sets a region C that is retracted by one region from the running end point toward the running start point in step S85, and calculates pass times $dt_1$, $dt_2$ in step S86, based on distances $L_1$, $L_2$ among the respective points of the maximum speed $V_n$ of this region $C_n$ (the running end point−1), the maximum speed $V_{n+1}$ of a region $C_{n+1}$ located ahead of the region $C_n$, and the maximum speed $V_{n-1}$ of a region $C_{n-1}$ located behind the region $C_n$, according to the following equations.

$$dt_1 = L_1/((V_{n-1}+V_n)/2)$$

$$dt_2 = L_2/((V_n+V_{n+1})/2)$$

Subsequently, the accelerations $A_1$, $A_2$ at this time are calculated according to the following equations.

$$A_1 = (V_n - V_{n-1})/dt_1$$

$$A_2 = (V_{n+1} - V_n)/dt_2$$

Furthermore, the jerk (the rate of change of acceleration) J at this time is calculated according to the following equation.

$$J = (A_2 - A_1)/((dt_1 + dt_2)/2)$$

The ECU 10 determines in step S87 whether the jerk J is equal to or larger than the lower-limit jerk $J_{max2}$. If it is determined in step S87 that the jerk J is equal to or larger than the lower-limit jerk $J_{max2}$, a jerk limiting condition is satisfied; therefore, the control proceeds to step S89. If, on the other hand, it is determined that the jerk J is smaller than the lower-limit jerk $J_{max2}$, the ECU 10 sets a margin coefficient k (e.g., 0.9) for the jerk lower limit in step S88, so as to speed up control of the jerk J within the limits. Then, the ECU 10 corrects the acceleration $A_2$ and the maximum speed $V_n$ according to the following equations, so as to satisfy the jerk limiting condition.

$$A_2 = (V_{n+1} - V_{n-1})/(dt_1 + dt_2) + J_{max2} \times dt_2/2 \times k$$

$$V_n = V_{n+1} + A_2 \times dt_2$$

Namely, when the jerk is smaller than the lower limit, the ECU 10 corrects the speed of the middle one of the three adjacent points which has the highest speed, to a lower speed.

In step S89, the ECU 10 determines whether the operation to correct the maximum speed $V_n$ is completed over a range from the point located ahead of the running end point to the second point as counted from the running start point. If it is determined that the operation to correct the maximum speed $V_n$ has not been completed with respect to all of the regions, the ECU 10 sets a region C that is retracted by one region from the region (point) C that has been processed toward the running start point, in step S89, and repeats the process of steps S86-S89. Then, if it is determined in step S88 that the operation to correct the maximum speed $V_n$ is completed over the range from the point located ahead of the running end point to the second point as counted from the running start point, the process of FIGS. 10A and 10B ends.

If the operation to correct the maximum speed $V_n$ is performed on the speed pattern, using jerks between the running end point and the running start point, the vehicle speed is adequately corrected at points where the speed increases after decreasing in each of the sections into which each curved traveling path is divided, as indicated by the thick line in FIG. 11.

Thus, in the vehicle running control system 1 of the third embodiment, the ECU 10 calculates a jerk (i.e., rate of change of acceleration) across adjacent regions, and compares the jerk with predetermined limit values (the upper limit and the lower limit), so as to perform a speed correcting operation.

Thus, the vehicle running control system 1 of the third embodiment is able to create a relatively stable speed pattern, without causing a significant change in the posture of the vehicle against pitching of the vehicle, thus assuring improved ride comfort.

When speed changes over adjacent regions C assume a concave or recessed shape, the vehicle running control system 1 of the third embodiment corrects a speed condition of the region C having the highest speed and located at the leading side in the direction of progression of the correcting operation, to a lower speed. When speed changes over adjacent regions C assume a convex shape, on the other hand, the control system 1 corrects a speed condition of the middle region C having the highest speed, to a lower speed. Thus, speed correction can be optimally made in accordance with speed changes over adjacent regions.

Figure 13:
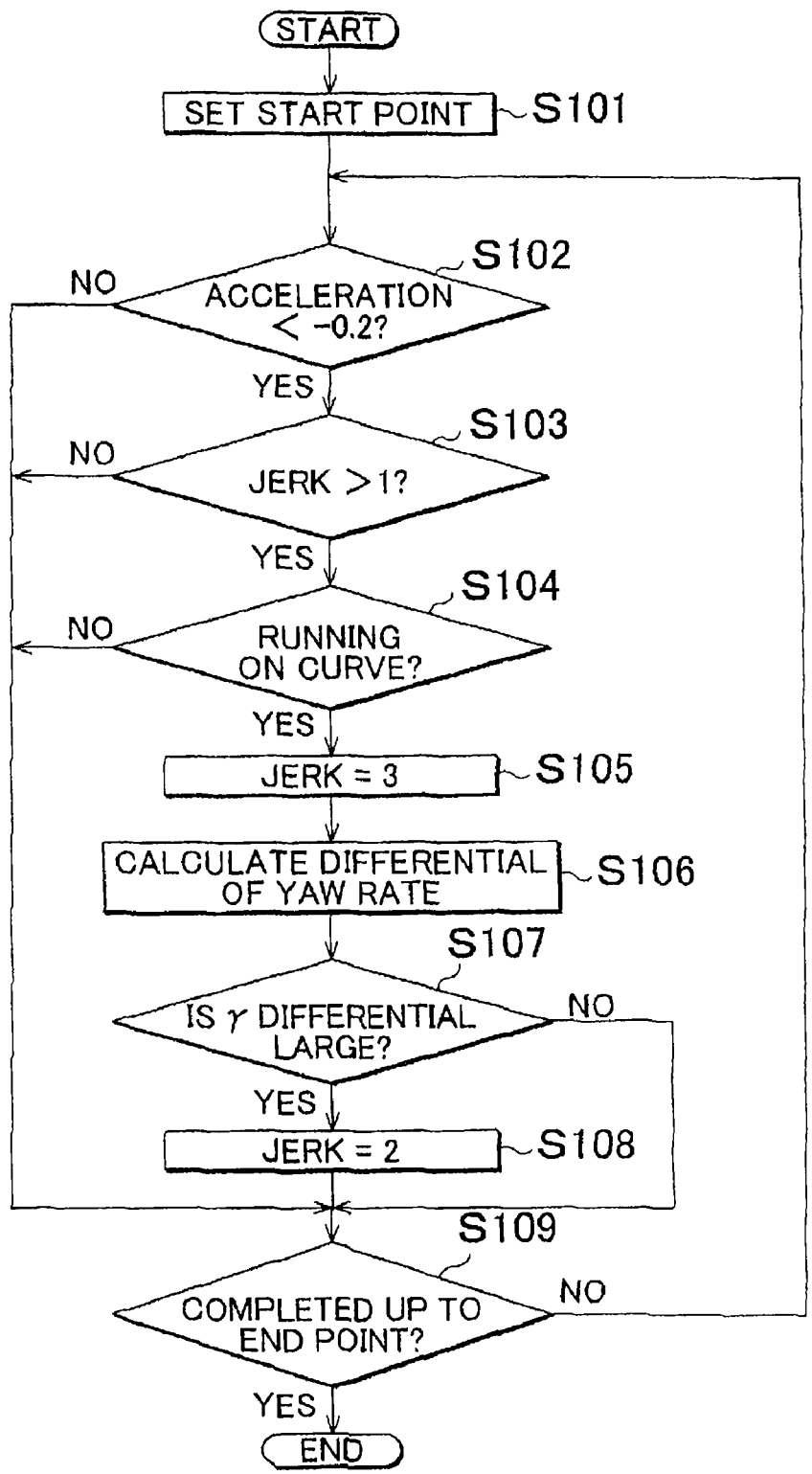
FIG. 13 is a flowchart illustrating a process of creating a speed pattern according to a traveling path, which is executed by a vehicle running control system according to a fourth embodiment of the invention.

FIG. 13 is a flowchart illustrating a process of creating a speed pattern according to a traveling path, which is executed by a vehicle running control system 1 according to a fourth embodiment of the invention. The overall configuration of the vehicle running control system 1 of this embodiment is substantially the same as that of the first embodiment as described above, and will be described with reference to FIG. 1. Also, the same reference numerals as used in the first embodiment are assigned to members or components having the same or similar functions as those of the first embodiment, and explanation of these members or components will not be repeated.

In the vehicle running control system 1 of the fourth embodiment, the first speed condition correcting unit and second speed condition correcting unit compare the jerk with predetermined upper limit and lower limit (limit values), so as to perform a speed correcting operation. In this embodiment, in particular, the upper limit and the lower limit are set in accordance with the shape of the target traveling path.

More specifically described, the vehicle running control system 1 of the fourth embodiment has a process to be carried out during the process of creating a speed pattern in the third embodiment as described above. Namely, in the process of creating a speed pattern in the third embodiment, the speed pattern is corrected, using the limit values of the jerk, so as to prevent instability in the posture of the vehicle due to pitching of the vehicle. In this case, if the line to be traveled shifts from a straight line to a curve, such that the turning radius R changes by a great degree, the speed pattern will be such that steering of the vehicle is effected after the deceleration returns to zero from full braking. This speed pattern is the optimum solution as long as the vehicle is regarded as one mass point. In the actual vehicle, however, the load of the front wheels for causing the yaw rate to appear in the vehicle is removed or reduced, and the speed pattern may be inappropriate for running the vehicle rapidly and safely.

Therefore, when the line to be traveled shifts from a straight line to a curve, the vehicle running control system 1 of the fourth embodiment sets a limit value of the jerk to a smaller value (e.g., 3 m/s$^3$) in a condition where the acceleration is largely negative (e.g., −0.2 G or less) and the jerk is positive, namely, in a condition where the vehicle starts cornering with the braking force being reduced, so as to prevent the load of the front wheels from being removed or reduced. The fourth embodiment may be implemented only by changing the limit value of the jerk during the process of creating a speed pattern in the third embodiment as described above. Even if the upper limit of the jerk is lowered (made more rigorous) at a point where the vehicle enters a curve, the vehicle will not enter the curve while it is simply too decelerated, but a point at which the vehicle starts being decelerated is adjusted so that the speed is optimally adjusted within that range. Since the vehicle that runs from a straight line to a curve requires force derived from the load of the front wheels for causing the vehicle to start turning in the yawing direction, which force is increased as changes in the yaw rate along the curve are larger, the jerk limit value is set to a lower value as changes in the yaw rate (differential values of the yaw rate) along the curve are larger.

A process of creating a speed pattern according to a traveling path, which is executed by the vehicle running control system 1 of the fourth embodiment, will be described in detail with reference to the flowchart of FIG. 13.

The process of creating a speed pattern according to a traveling path with the vehicle running control system 1 of the fourth embodiment is carried out during the speed pattern creating process (the flowchart of FIG. 10A and FIG. 10B) of the third embodiment. Namely, as shown in FIG. 13, the ECU 10 sets a region of the running start point in step S101, and determines in step S102 whether the acceleration of the vehicle is smaller than −0.2 G. If it is determined in step S102 that the vehicle acceleration is equal to or larger than −0.2 G, the control proceeds to step S109.

If, on the other hand, it is determined in step S102 that the vehicle acceleration is smaller than −0.2 G, the ECU 10 determines in step S103 whether the jerk is larger than 1 m/s$^3$. While this step is intended to determine whether the jerk is a positive value, the ECU 10 compares the jerk with 1 m/s$^3$ in view of errors, or the like. If it is determined in, step S103 that the jerk is equal to or smaller than 1 m/s$^3$, the control proceeds to step S109. If, on the other hand, it is determined in step S103 that the jerk is larger than 1 m/s$^3$, the ECU 10 determines in step S104 whether the vehicle is running on a curve, namely, whether the turning radius R of the vehicle is equal to or smaller than 300 m. If it is determined that the turning radius R of the vehicle is larger than 300 m, the control proceeds to step S109.

If, on the other hand, it is determined that the turning radius R of the vehicle is equal to or smaller than 300 m, the ECU 10 sets the upper-limit jerk $J_{max1}$ to a smaller value in step S105. While the upper-limit jerk $J_{max1}$ is set to 6 m/s$^3$ in the third embodiment as described above, the upper-limit jerk $J_{max1}$ is set to 3 m/s$^3$ in step S105 in the fourth embodiment. In step S106, the ECU 10 calculates a yaw rate $\gamma_1$ from the relationship between the speed of a point in the region that is being processed and the turning radius R, and calculates a yaw rate $\gamma_2$ of a point located adjacent to this point, so as to calculate a differential value of the yaw rate from the amount of change thereof, according to the following equation.

$$\text{Differential value of yaw rate} = (\gamma_2 - \gamma_1)dt$$

In step S107, the ECU 10 determines whether the yaw-rate differential value is larger than a predetermined set value. If the differential value is larger than the set value, the ECU 10 sets the upper-limit jerk $J_{max1}$ to an even lower value, for example, sets the upper-limit jerk $J_{max1}$ to 2 m/s$^3$.

In step S109, the ECU 10 determines whether the operation to correct the upper-limit jerk is completed over a range from the running start point to the running end point. If it is determined that the correcting operation has not been completed, the ECU 10 repeats the process of steps S102-S109 so as to perform the correcting operation on the next region. Then, if it is determined in step S109 that the operation to correct the upper-limit jerk is completed over the range from the running start point to the running end point, the ECU 10 finishes the process of FIG. 13.

Thus, in the vehicle running control system 1 of the fourth embodiment, the ECU 10 compares the jerk with the predetermined upper limit and lower limit so as to perform a speed correcting operation, and the upper limit and the lower limit are set in accordance with the shape of the target traveling path.

Accordingly, the vehicle running control system 1 of the fourth embodiment creates a speed pattern that ensures a sufficient load of the front wheels and enables the vehicle to turn with appropriate yawing when the vehicle enters a curved path, thus assuring increased safety and improved ride comfort.

Figure 14:
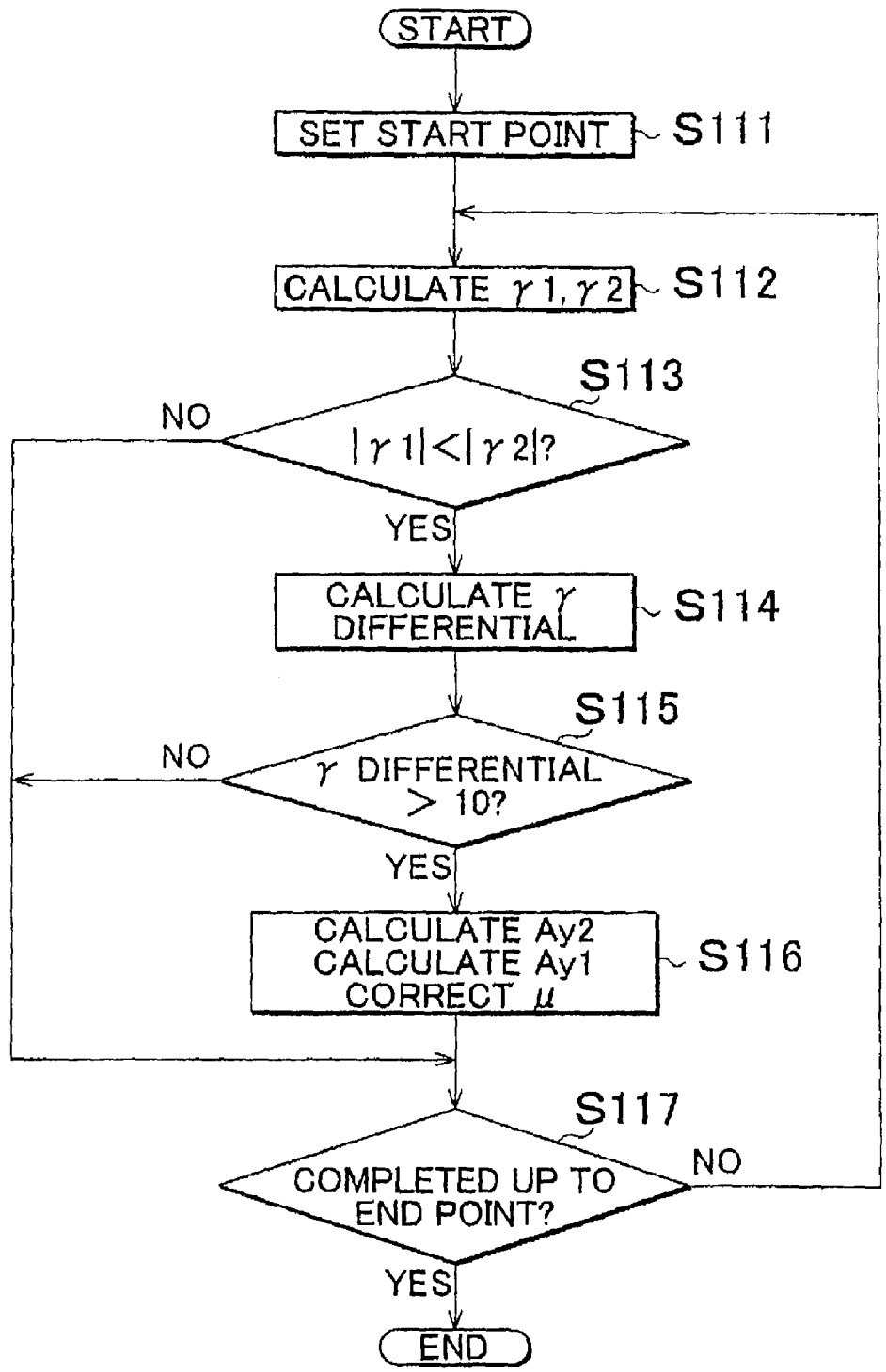
FIG. 14 is a flowchart illustrating a process of creating a speed pattern according to a traveling path, which is executed by a vehicle running control system according to a fifth embodiment of the invention.

FIG. 14 is a flowchart illustrating a process of creating a speed pattern according to a traveling path, which is executed by a vehicle running control system 1 according to a fifth embodiment of the invention. The overall configuration of the vehicle running control system 1 of this embodiment is substantially the same as that of the first embodiment as described above, and will be described with reference to FIG. 1. Also, the same reference numerals as used in the first embodiment are assigned to members or components having the same or similar functions as those of the first embodiment, and explanation of these members or components will not be repeated.

In the vehicle running control system 1 of the fifth embodiment, while the first speed condition correcting unit and second speed condition correcting unit correct speed conditions while regarding the vehicle as a mass-point model, the correcting units also correct lateral force conditions while regarding the vehicle as a rigid body model, after the operation to correct a speed condition for each of the regions into which the traveling path is divided is completed.

Described more specifically, the vehicle running control system 1 of the fifth embodiment has a process to be carried out during the process of creating a speed pattern according to the first embodiment as described above. Namely, in the process of creating a speed pattern in the first embodiment, the vehicle is regarded as one mass point. Therefore, in a situation where the yaw rate changes frequency, such as during slalom running of the vehicle, lateral force for causing the vehicle to turn in the yawing direction while overcoming the yaw rate of the vehicle cannot be generated, and the tires may slip. In the third and fourth embodiments as described above, an effect of stabilizing the posture of the vehicle is provided by correcting the speed using the jerk. However, it is essentially and physically difficult to force the vehicle that enters a curve while running at an extremely high speed to turn about itself, thus, the speed of the vehicle needs to be appropriately reduced.

Therefore, the vehicle running control system 1 of the fifth embodiment reduces the speed while not only regarding the vehicle as one mass point, but also treating the vehicle as a rigid body having the moment of inertia at the yaw rate. Namely, when the vehicle enters a curved path from a straight path and turns, the load on the front wheels increases so as to increase the yaw rate. The vehicle running control system 1 reduces the speed so that the tires lie within the friction circles even if the increased load is applied to the front wheels. More specifically, when the absolute value of the yaw rate increases, and the degree (or rate) of change of the yaw rate (differential value of the yaw rate) is larger than a set value, the lateral force which causes the vehicle to turn only by means of the front wheels is added to the lateral force required by the vehicle as a whole (the moment of inertia at the yaw rate×differential value of the yaw rate/distance from the position of the gravity of the vehicle to the front axle), so as to reduce the speed of the vehicle. If, on the other hand, the absolute value of the yaw rate decreases, and the degree of change of the yaw rate (differential value of the yaw rate) is larger than a set value, the lateral force applied to the front wheels may be reduced to be lower than that applied to the front wheels; therefore, the above-described operation is not performed.

A process of creating a speed pattern according to a traveling path, which is executed by the vehicle running control system 1 of the fifth embodiment, will be described in detail with reference to the flowchart of FIG. 14.

The vehicle running control system 1 of the fifth embodiment carries out the process of creating a speed pattern according to a traveling path, during execution of the speed pattern creating process of the first embodiment (as illustrated in the flowchart of FIG. 2). Namely, as shown in FIG. 14, the ECU 10 sets a region of the running start point in step S111, calculates a yaw rate $\gamma_1$ from the relationship between the speed of a point in the region that is being processed and the turning radius R, and calculates a yaw rate $\gamma_2$ of a point located adjacent to the above point, in step S112. Then, the ECU 10 determines in step S113 whether the absolute value of the yaw rate $\gamma_1$ is smaller than the absolute value of the yaw rate $\gamma_2$.

If it is determined that the absolute value of the yaw rate $\gamma_1$ is equal to or larger than the absolute value of the yaw rate $\gamma_2$, the control proceeds to step S117. If, on the other hand, it is determined that the absolute value of the yaw rate $\gamma_1$ is smaller than the absolute value of the yaw rate $\gamma_2$, the ECU 10 calculates a differential value of the yaw rate from the amount of change of the yaw rate in step S114, according to the following equation.

Differential value of yaw rate=$(\gamma_2-\gamma_1)dt$

Then, the ECU 10 determines in step S115 whether the differential value of the yaw rate is larger than a predetermined set value (e.g., 0 deg/s$^2$). If it is determined that the differential value of the yaw rate is equal to or smaller than the set value, the control proceeds to step S117. If, on the other hand, it is determined that the differentia value of the yaw rate is larger than the set value, the ECU 10 calculates a lateral force $Ay_2$ required to provide the differential value of the yaw rate of the vehicle in step S116, according to the following equation.

$$Ay_2 = I \times \gamma / Lf$$

where, I is the moment of inertia at the yaw rate, and Lf is the distance from the position of the gravity of the vehicle to the front axle.

Also, the ECU 10 calculates a lateral force $Ay_1$ using the coefficient of friction μ of the road and the gravitational acceleration g, according to the following equation.

$$Ay_1 = \mu \times g$$

Then, the coefficient of friction μ of the road is changed into a deemed coefficient of friction μ in view of the moment of inertia at the yaw rate, according to the following equation.

Deemed coefficient of friction $\mu = \mu \times Ay_1/(Ay_1+Ay_2)$

In step S117, the ECU 10 determines whether the operation to correct the coefficient of friction μ is completed over a range from the running start point to the running end point. If it is determined that the correcting operation has not been completed, the ECU 10 repeats the process of steps S112-S117 so as to perform a correcting operation on the next region C. Then, if it is determined in step S117 that the operation to correct the coefficient of friction μ is completed over the range from the running start point to the running end point, the ECU 10 finishes the process of FIG. 14.

Thus, in the vehicle running control system 1 of the fifth embodiment, when the ECU 10 performs an operation to correct a speed condition for each of the regions into which the target traveling path is divided, the ECU 10 corrects lateral force conditions while regarding the vehicle as a rigid-body model, after completing the operation to correct speed conditions while regarding the vehicle as a mass-point model.

It is thus possible to create an appropriate speed pattern according to which the vehicle runs while turning about itself in a running condition, such as slalom running, in which the yaw rate changes frequently.

In the illustrated embodiments, the vehicle running control system 1 according to the invention is applied to automatic running control of the vehicle. However, the vehicle running control system of the invention may be applied to vehicles capable of automatic running control and manual running control.

Next, a vehicle running control system 1 according to a sixth embodiment of the invention will be described in detail. Initially, the arrangement of ECU (electronic control unit) 10 and other components of the vehicle running control system 1 will be described with reference to FIG. 15.

Figure 15:
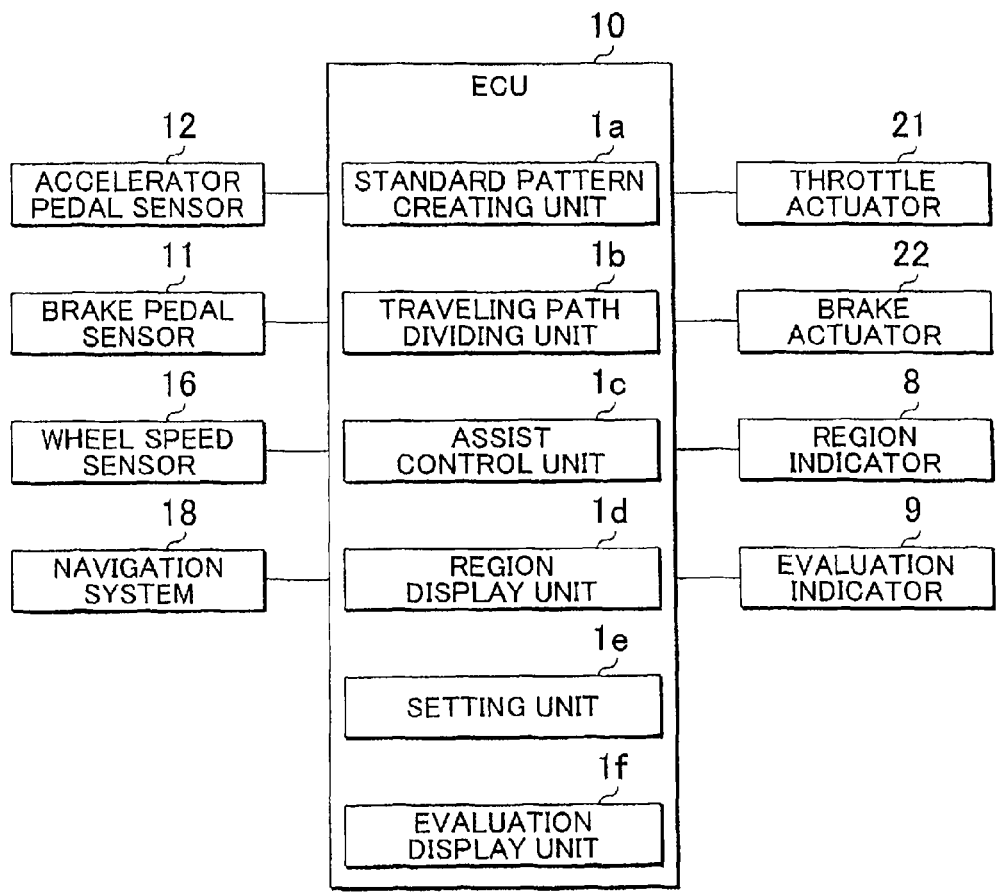
FIG. 15 is a view showing the arrangement of ECU and other components of a vehicle running control system according to a sixth embodiment of the invention.

As shown in FIG. 15, an accelerator pedal sensor 12, brake pedal sensor 11, wheel speed sensor 16, navigation system 18, throttle actuator 21, brake actuator 22, region indicator 8 and an evaluation indicator 9 are connected to the ECU 10 (including the vehicle running control system 1 of the invention) installed on the vehicle. As shown in FIG. 15, the ECU 10 includes a speed pattern creating unit 1a, traveling path dividing unit 1b, assist control unit 1c, region display unit 1d, setting unit 1e and an evaluation display unit 1f.

Figure 16:
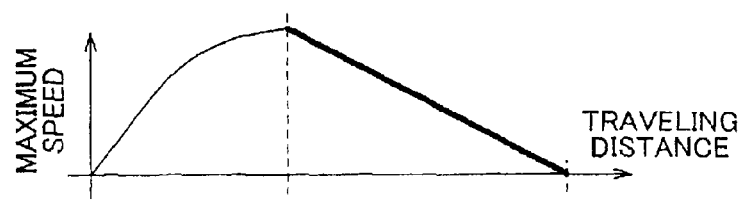
FIG. 16 is a schematic view showing one example of target speed pattern.

The speed pattern creating unit 1a creates a speed pattern (or an acceleration pattern), based on information on the shape of a traveling course (for example, information on the turning radius R of the road, information on the coefficient of friction μ between the tires and the road surface), and driver-requested tasks (for example, the destination or location of a goal, arrival time, and the importance placed on the fuel efficiency). The speed pattern thus created is concerned with changes in the speed (or acceleration) which lead to a result evaluated as the optimum while fulfilling the requested tasks. More specifically, when the location of the goal and the time at which the vehicle is expected to reach the goal are set as requested tasks, the speed pattern creating unit 1a creates a speed pattern that is evaluated as providing the highest fuel efficiency within a range in which the set conditions are satisfied. FIG. 16 shows one example of speed pattern created by the speed pattern creating unit 1a.

Figures 17, 18:
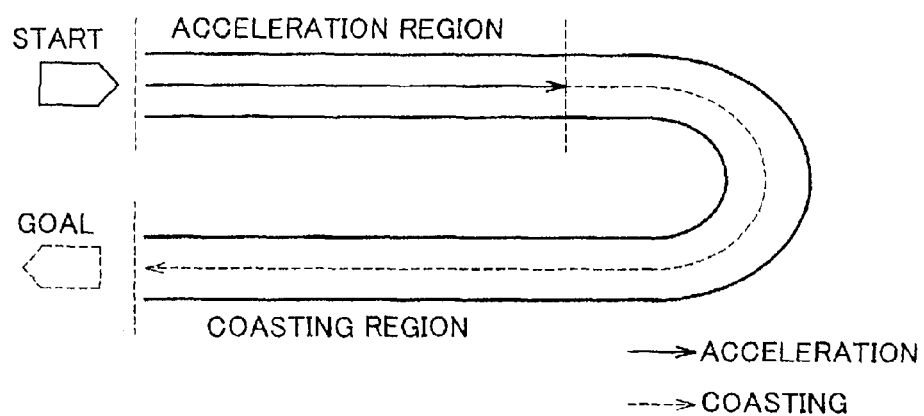
FIG. 17 is a schematic view showing one example of acceleration region and coasting region.
FIG. 18 is a view showing one example of the relationship between regions and assist control.

Referring back to FIG. 15, the traveling path dividing unit 1b divides the speed pattern obtained in the speed pattern creating unit 1a into a plurality of regions C depending on the running conditions. In other words, the traveling path dividing unit 1b divides a given traveling course into a plurality of regions C, in accordance with the target speed or target acceleration. In order to improve the fuel efficiency as much as possible, "acceleration" and "coasting" using no engine brake are incorporated as running conditions (running patterns). In this embodiment in which great importance is placed on the fuel efficiency, the speed pattern is divided into two regions, i.e., "acceleration region" as a region C in which the speed is increased, and "coasting region" as a region C in which the vehicle coasts substantially with the rolling resistance alone. FIG. 17 shows one example of acceleration region and coasting region into which the traveling course is divided by the traveling path dividing unit 1b, along with the traveling course.

Referring back to FIG. 15, the assist control unit 1c performs assist control that places importance on the fuel efficiency, based on the speed pattern created by the speed pattern creating unit 1a and the regions defined by the traveling path dividing unit 1b. More specifically, in the acceleration region, the assist control unit 1c performs assist control of one or both of "needless acceleration limitation (restriction)" and "acceleration assist", according to a deviation between the target acceleration and the driver-requested acceleration. In the coasting region, the assist control unit 1c performs assist control of one of "acceleration limitation (restriction)" and "coasting assist", depending on the ON/OFF state of the accelerator pedal. FIG. 18 shows one example of the relationship between the region and the assist control.

The "needless acceleration limitation (restriction)" is assist control for placing limitation or restriction on the requested acceleration entered by the driver, when the driver-requested acceleration exceeds the target acceleration pattern. The "acceleration assist" is assist control for increasing the acceleration to be larger than the requested acceleration entered by the driver within a range in which the increased acceleration does not pose a danger nor causes the driver to feel uncomfortable, when the driver-requested acceleration falls below the acceleration pattern, which makes it difficult to achieve the task(s) set by the driver.

In this connection, a coordination method taking account of the driver's feeling (such as discomfort), according to which both of the assist controls, "needless acceleration limitation" and "acceleration assist", can be implemented at the same time, will be explained. The acceleration requested by the driver and a target value of acceleration set by a driving force control system are coordinated, based on the Weber-Fechner's law ($E[dB]=K \times \log(R)$) that "the amount of perception E is proportional to the logarithm of stimulus R", and a command value of acceleration is set. For the amount of perception E, there is a differential threshold as an amount of change dE [dB] of stimulus, based on which it is determined whether a change of stimulus relative to the current stimulus (acceleration) is noticeable or not. The differential threshold is set for each of the increase side and decrease side of the absolute value of the acceleration, with reference to the driver-requested acceleration. In the driving force control of the vehicle, the acceleration applied to the driver is the same (substantially the same) as the acceleration of the vehicle, and the acceleration applied to the driver changes similarly to the acceleration of the vehicle when it is changed. In other words, the amount of perception E of the driver may be calculated using the acceleration of the vehicle as stimulus R, instead of the acceleration applied to the driver.

Also, a threshold dE/dt [dB/s] is provided based on which it is determined whether a change of stimulus with time is noticeable. The time-series differential threshold has two values of the increase side of the absolute value (the upper limit of the amount of correction of jerk as will be described later) and the decrease side (the lower limit of the jerk correction amount), with reference to the driver-requested jerk. Guard values are respectively set for the acceleration (driving force) and the rate of change of acceleration, based on the differential thresholds based on which it is determined whether a change of the acceleration is noticeable, and the time-series differential thresholds based on which it is determined whether a change of the jerk is noticeable. Furthermore, when the amount of operation of the accelerator pedal or brake pedal by the driver changes largely in a short time, namely, when the driver desires a large change in the acceleration, the guard value set for the rate of change of acceleration is relaxed.

Returning to the explanation of the assist control unit 1c, the "acceleration limitation (restriction)" is assist control for positively limiting or reducing the driver-requested acceleration in the coasting region when the driver places the accelerator pedal in the ON state. The assist control of the acceleration limitation is set in this manner, because it can be determined that there is basically no need to accelerate the vehicle in the coasting region (in other words, the set task(s) can be satisfactorily accomplished without accelerating the vehicle). The "coasting assist" is assist control for coasting the vehicle (with no torque produced by the vehicle) without applying engine brake to the vehicle when the driver places the accelerator pedal in the OFF state.

This embodiment has features (advantages) that (1) the control side has a target speed/acceleration pattern, and (2) the control side knows what running condition (running pattern) the vehicle should be in, at a certain position (region) on the course, (for example, what is needless in the acceleration region). With this arrangement, the control side is able to perform positive and effective assist control, in response to the operational input of the driver.

Figure 19A:
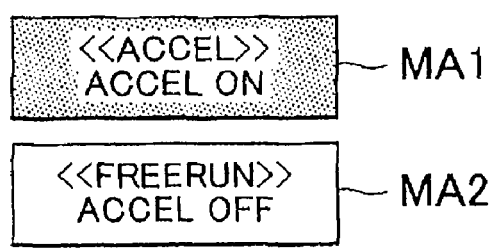
FIG. 19A and FIG. 19B are views showing one example of region indicators.
Figure 19B:
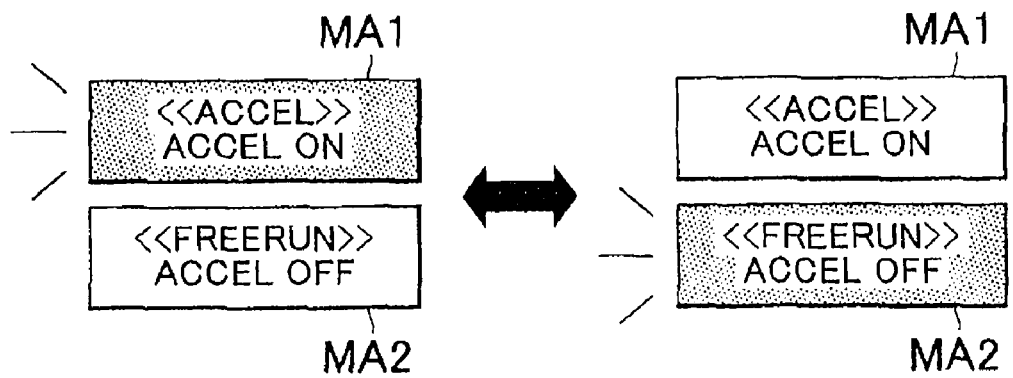

Referring back to FIG. 15, the region display unit 1d displays the status (more specifically, "acceleration" or "coasting") of the running condition (running pattern) at the position (region) where the vehicle is currently running, on a region indicator 8 installed on the vehicle. One example of the region indicator 8 will be described with reference to FIG. 19A and FIG. 19B. The region indicator 8 consists of a pair of indicators MA1 and MA2 as shown in FIG. 19A. The indicator MA1 clearly indicates that the current region is an acceleration region, and presents a content requested to the driver, by means of, for example, letters and lighting, and the indicator MA2 clearly indicates that the current region is a coasting region, and presents a content requested to the driver, by means of, for example, letters and lighting. As shown in FIG. 19B, the region display unit 1d switches lighting of the indicators MA1 and MA2, based on the region information at the current position. In the examples of FIG. 19A and FIG. 19B, "《Accel》 Accel On" is one example of letters corresponding to clear indication of the acceleration region and presentation of the request for accelerator pedal ON, and "《FreeRun》 Accel Off" is one example of letters corresponding to clear indication of the coasting region and presentation of the request for accelerator pedal OFF.

Referring back to FIG. 15, the setting unit 1e sets an evaluation point in steps, with respect to a deviation between a controlled variable associated with the target speed in the speed pattern and a controlled variable associated with the speed entered by the driver (for example, a difference between the target speed and the driver input speed), or a deviation between a controlled variable associated with the target acceleration in the acceleration pattern and a controlled variable associated with the acceleration entered by the driver (for example, a difference between the target acceleration and the driver input acceleration).

Figure 20A:
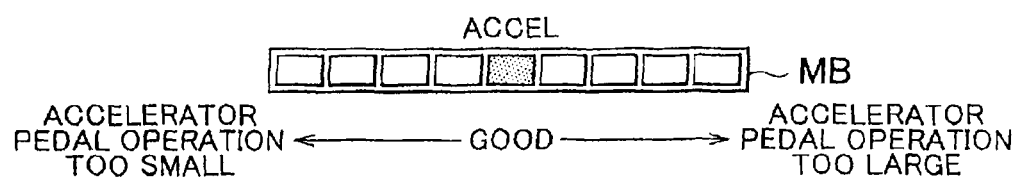
FIG. 20A and FIG. 20B are views showing one example of evaluation indicator.
Figure 20B:
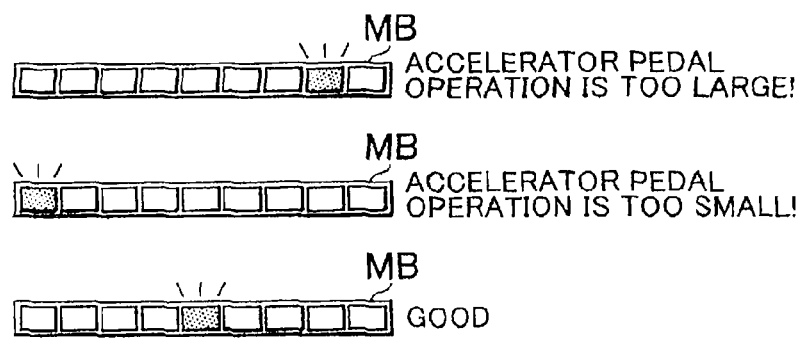

The evaluation display unit 1f displays the evaluation point set by the setting unit 1e, on an evaluation indicator 9 installed on the vehicle. One example of the evaluation indicator 9 will be described with reference to FIG. 20A and FIG. 20B. The evaluation indicator 9 is an indicator MB as shown in FIG. 20A. The indicator MB consists of a plurality of (preferably, an odd number of) sections that correspond to the respective evaluation points and can be illuminated, and is operable to indicate the evaluation point set by the setting unit 1e by lighting up an appropriate one of the sections. The evaluation display unit 1f defines (determines) the section corresponding to the evaluation point, and lights up the section thus determined, as indicated in FIG. 20B.

In this embodiment, the control side positively and effectively performs assist control in response to the operational input of the driver. In addition, the control side positively gives information possessed by or known to the control side to the driver via the indicator(s). Owing to these interactions between the driver and the control side, the compatibility between the operation of the driver and vehicle control can be further improved, and further enhanced performance for improved fuel efficiency can be achieved.

Figure 21:
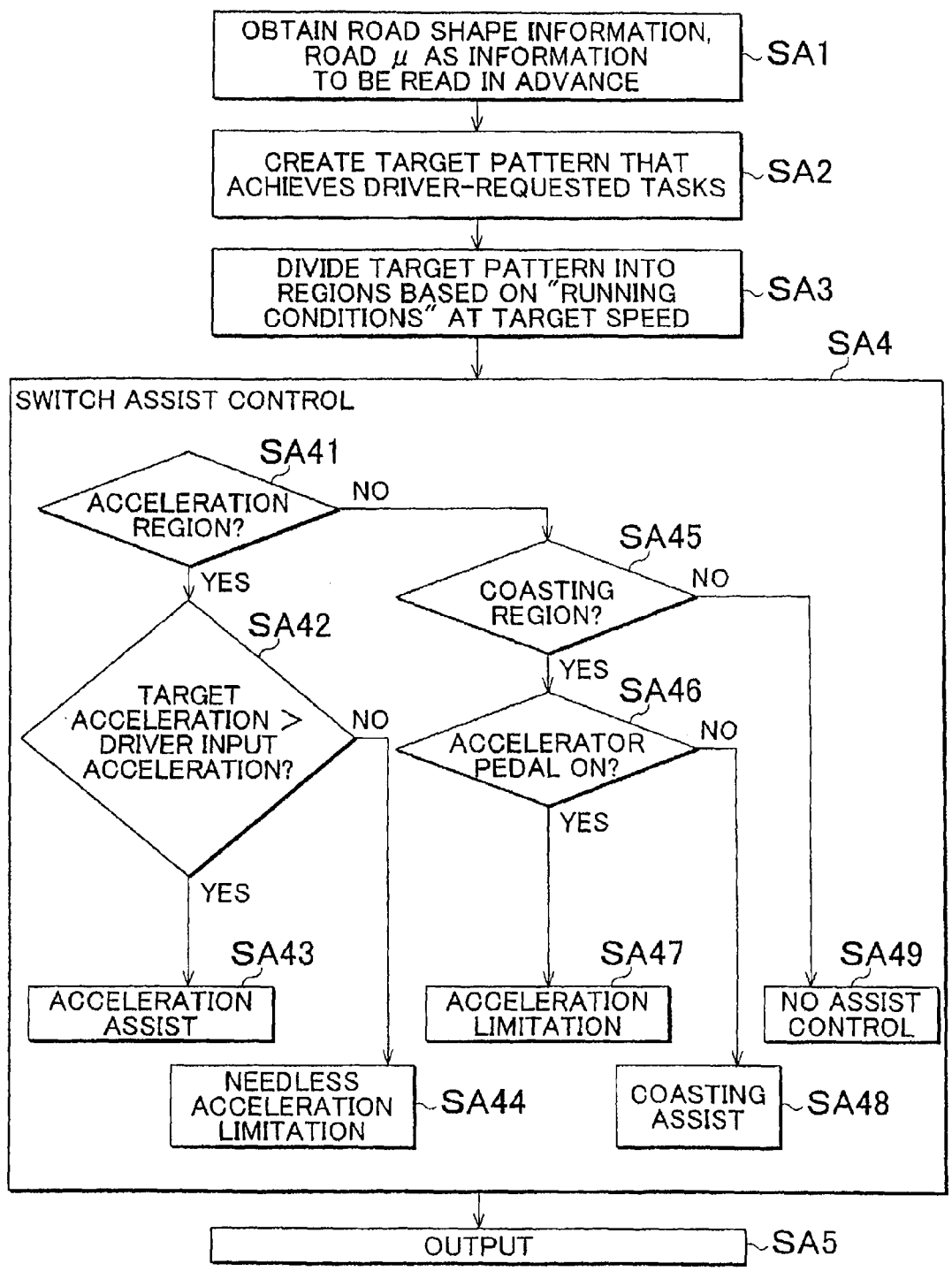
FIG. 21 is a flowchart illustrating one example of main operation.

Next, one example of main operation performed by the ECU 10 configured as described above will be described with reference to FIG. 21. FIG. 21 is a flowchart illustrating one example of main operation of this embodiment.

Initially, the ECU 10 obtains road shape information and the coefficient of friction μ between the tires and the road surface, as information to be read in advance (step SA1).

Then, the speed pattern creating unit 1a of the ECU 10 creates a target speed/acceleration pattern (including a speed pattern) according to which driver-requested tasks, including the target arrival time and the optimum fuel efficiency, are accomplished, based on the information obtained in step SA1 (step SA2).

As one example of method of calculating the speed pattern, the road is divided into acceleration regions and coasting regions (deceleration regions), and the speed pattern is calculated using different evaluation functions for the acceleration regions and coasting regions, respectively. More specifically, running conditions (running pattern) of the vehicle when running on a road are predicted, based on road shape information stored in a road shape information file, and the road is divided into two or more road regions, based on the predicted running conditions (running pattern). Then, an evaluation function for each road region is set, and the traveling track of the vehicle running on the road is calculated, based on the evaluation functions set for the respective road regions. Also, the ECU 10 calculates the traveling track, using the positions at which the road is divided into the road regions as variable conditions. The traveling track indicates the position of the vehicle running on a traveling course (target traveling path).

The ECU 10 calculates a predicted speed pattern the vehicle is expected to follow when running on the road, based on road shape information stored in the road shape information file, divides the road into at least an acceleration region and a deceleration region as road regions, based on the calculated speed pattern, and sets an evaluation function for acceleration region at the acceleration region and an evaluation function for deceleration region at the deceleration region. For the acceleration region, an evaluation function that evaluates the case where the engine speed is equal to or higher than a middle speed as being more desirable than the case where the engine speed is around zero, is set. More specifically, the ratio of the thermal efficiency of each point (region) when the best point of the thermal efficiency of the engine is equal to 1 is obtained, and an evaluation function that gives an evaluation value by subtracting 1 from the total value of the entire system is set, such that the evaluation value when the engine speed is around zero is a numerical value larger than 0. For the deceleration region, an evaluation function that evaluates the case where engine speed is around zero as being mode desirable than the case where the engine speed is equal to or higher than a middle speed is set. More specifically, an evaluation function is set which provides an evaluation value equal to a numerical value that is proportional to the loss of energy input/output in a hybrid system, with respect to the acceleration/deceleration energy released from the deceleration of the rolling resistance, when the rolling resistance is set at 0 as a reference, and the evaluation value when the engine speed is equal to or higher than a middle speed is a numerical value larger than 0.

Also, the ECU 10 calculates a predicted rate of usage of friction circle when the vehicle runs on the road, based on road shape information stored in the road shape information file, and sets different evaluation functions with respect to a road region where the calculated rate of usage of friction circle is relatively high, and a road region where the calculate rate of usage of friction circle is relatively low. More specifically, the ECU 10 sets an evaluation function for the acceleration region, which evaluates it as being desirable to accelerate the vehicle with the engine basically in a rotating state while utilizing a hybrid system for improvement in the fuel efficiency, and sets an evaluation function for the deceleration region, which evaluates it as being desirable to decelerate the vehicle with the engine basically in the OFF state while utilizing regenerative braking and electric power assist.

Next, another example of calculation of the speed pattern will be described. The ECU 10 corrects a normally created speed pattern (steady-state circle maximum speed pattern) by correcting speed conditions in a direction from the start position of running control toward the end position thereof, and correcting speed conditions in a direction from the end position of running control toward the start position thereof, so as to calculate a speed pattern. More specifically, the ECU 10 is configured to create a speed pattern along a target traveling path (course), and control running of the vehicle based on the speed pattern, and includes a first speed condition correcting unit that performs an operation to correct speed conditions in a direction from the start position of running control to the end position of running control on the target traveling path, and a second speed condition correcting unit that performs an operation to correct speed conditions in a direction from the end position of running control to the start position of running control on the target traveling path. Thus, the ECU 10 corrects the speed conditions in the direction from the start position to end position of running control on the target traveling path, and corrects the speed conditions in the direction from the end position to start position of running control, without using the optimization method, so as to create a speed pattern according to the traveling path within a short time. Also, the ECU 10 corrects acceleration-side speed conditions that provide accelerations in the speed pattern, and also corrects deceleration-side speed conditions that provide decelerations in the speed pattern. In this case, the ECU 10 corrects appropriate ones of the speed conditions to lower speeds.

Also, the ECU 10 includes a traveling path dividing unit that divides the target traveling path into a plurality of regions at fixed or given intervals, and performs a correcting operation on a speed condition for each of the regions C into which the traveling path is divided. Specifically, the ECU 10 compares speed conditions of adjacent regions C, and corrects the speed condition of the higher-speed region C to a lower speed. In this case, an acceleration or a deceleration is determined by comparing the speeds of adjacent regions C, and a correcting operation is performed so that the acceleration or deceleration does not exceed the upper limit. Thus, the ECU 10 divides the target traveling path into a plurality of regions C at fixed intervals, and performs a correcting operation on each of the regions C to correct appropriate ones of the speed conditions to lower speeds.

The ECU 10 may calculate a deceleration across adjacent points set in sequence in a direction from the running end point toward the running start point, after calculating an acceleration across adjacent points set in sequence in a direction from the running start point toward the running end point, with respect to the steady-state circle maximum speed pattern of the target traveling path. Also, the ECU 10 may calculate an acceleration across adjacent points set in sequence in the direction from the running start point toward the running end point, after calculating a deceleration across adjacent points set in sequence in the direction from the running end point toward the running start point, with respect to the steady-state circle maximum speed pattern of the target traveling path.

Referring back to FIG. 21, the traveling path dividing unit 1b of the ECU 10 divides the target speed/acceleration pattern created in step SA2 into two regions, i.e., "acceleration region" and "coasting region", based on the running conditions in the target speed/acceleration pattern (step SA3).

Then, the assist control unit 1c of the ECU 10 performs assist control according to the regions C defined by the traveling path dividing unit 1b in step SA3 while monitoring the actual running of the vehicle (step SA4).

More specifically, when the actual running position of the vehicle is in the acceleration region C defined by the traveling path dividing unit in step SA3 (YES in step SA41), the assist control unit 1c of the ECU 10 performs assist control of "acceleration assist" as described above (step SA43) when the driver input acceleration estimated from the current amount of depression of the accelerator pedal, amount of depression of the brake pedal and the vehicle speed falls below the target acceleration (YES in step SA42). If, on the other hand, the driver input acceleration is equal to or larger than the target acceleration (NO in step S42), the ECU 10 performs assist control of "needless acceleration limitation" as described above (step SA44). More specifically, the ECU increases a gain of a map of the relationship between the accelerator pedal depression and the requested acceleration, as assist control of "acceleration assist", in step SA43, and reduces the gain of the map of the accelerator pedal depression and the requested acceleration, as assist control of "needless acceleration limitation", in step SA44.

Also, when the actual running condition of the vehicle is not in the acceleration region C defined by the traveling path dividing unit in step SA3 (NO in step SA41), but the actual running condition is in the coasting region (YES in step SA45), the assist control unit 1c of the ECU 10 performs assist control of the above-described "acceleration limitation" (step SA47) if the driver places the accelerator pedal in the ON state (YES in step SA46), and performs assist control of the above-described "coasting assist" (step SA48) if the driver places the accelerator pedal in the OFF state (NO in step SA46). More specifically, the ECU 10 largely reduces the gain of the map of the relationship between the accelerator pedal depression and the requested acceleration, as assist control of "acceleration limitation", in step S47. In this connection, the reduced gain used in the "acceleration limitation" performed in step SA47 may be set to be larger than the reduced gain used in the "needless acceleration limitation" performed in step SA44. In step SA48, the ECU 10 performs assist control of "coasting assist", by making torque generated by the vehicle equal to zero when the vehicle is an HV (hybrid) vehicle, or causing the vehicle to run as if the N (neutral) range is selected when the vehicle is a MT (manual transmission) vehicle.

When the actual running position of the vehicle is not in the coasting region (NO in step SA45), the assist control unit 1c of the ECU 10 does not perform assist control (step SA49). For example, if the gain of the map is changed, the gain is returned to the original state.

Returning to the explanation of the main operation of FIG. 21, the ECU 10 controls the output of each actuator (step SA5) so as to carry out the assist control selected in step SA4. More specifically, the ECU 10 controls the output of the throttle actuator 6, etc., so that the vehicle runs according to the map of the accelerator pedal depression and the requested acceleration, for which the gain is changed as needed through execution of the assist control in step SA4.

Figure 22:
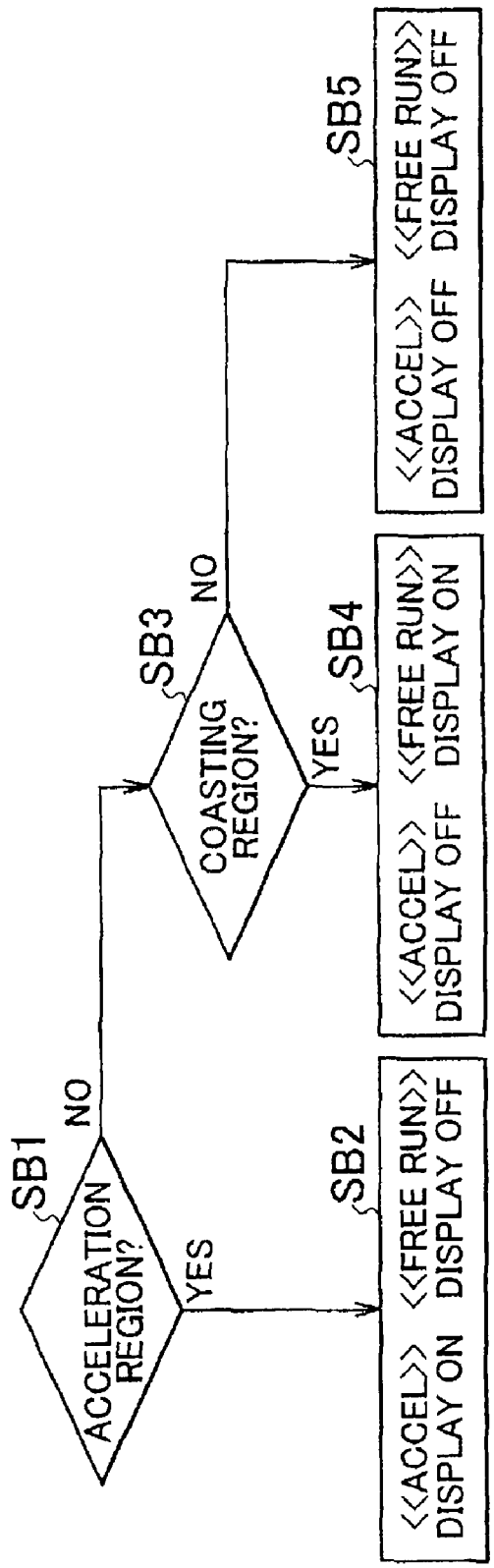
FIG. 22 is a flowchart illustrating one example of region display operation.

Next, one example of region display operation performed by the ECU 10 configured as described above will be described with reference to FIG. 22. FIG. 22 is a flowchart illustrating one example of the region display operation of this embodiment.

Initially, when the actual running condition of the vehicle is in the acceleration region (YES in step SB1), the region display unit 1d of the ECU 10 turns on the indicator MA1 and turns off the indicator MA2 (step SB2).

Also, when the actual running condition of the vehicle is not in the acceleration region (NO in step SB1), the region display unit 1d of the ECU 10 turns off the indicator MA1 and turns on the indicator MA2 (step SB4) if it is in the coasting region (YES in step SB3), and turns off both the indicator MA1 and the indicator MA2 (step SB5) if it is not in the coasting region (NO in step SB3).

Figure 23:
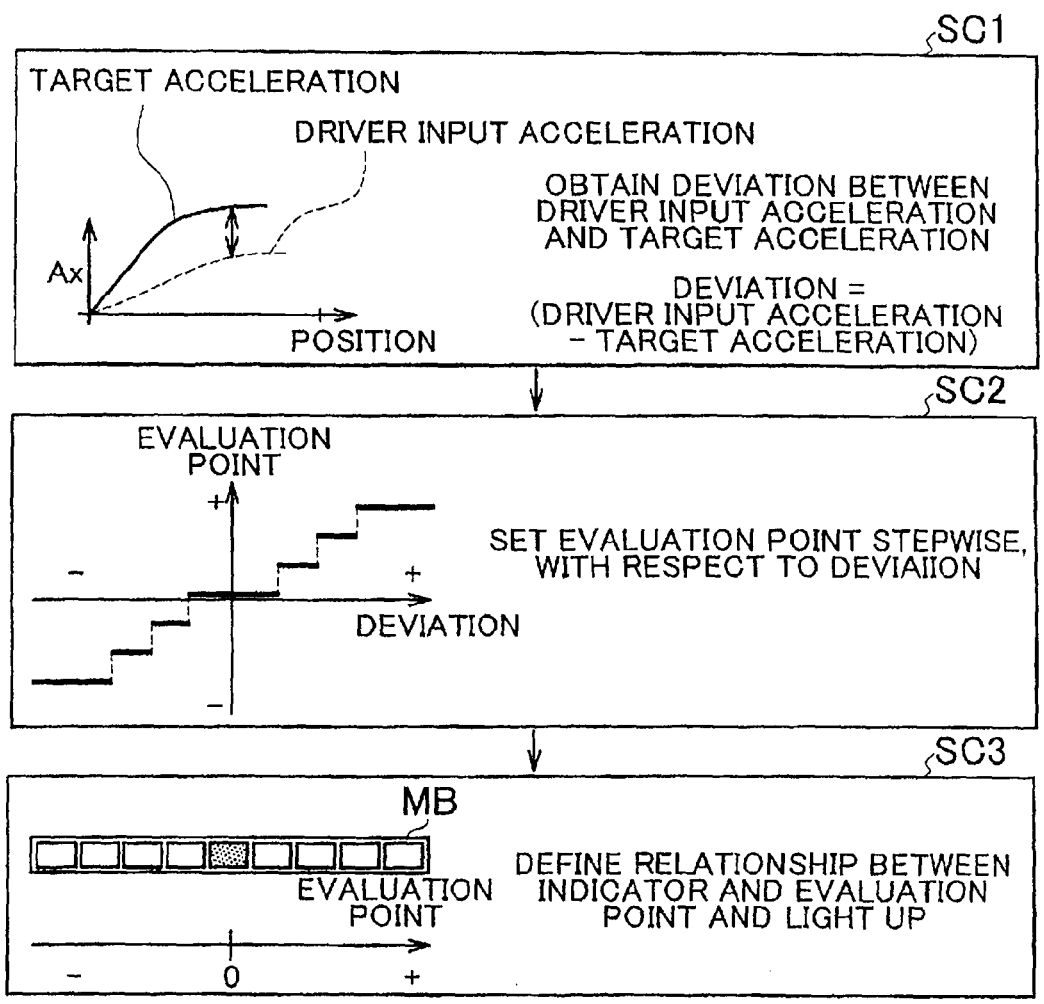
FIG. 23 is a flowchart illustrating one example of evaluation point display operation.

Next, one example of evaluation point display operation performed by the ECU 10 configured as described above will be described with reference to FIG. 23. FIG. 23 is a flowchart illustrating one example of evaluation point display operation of this embodiment.

Initially, the setting unit 1e of the ECU 10 obtains a difference "input acceleration-target acceleration" between the driver's input acceleration estimated from the current accelerator pedal input amount, brake pedal input amount and the vehicle speed, and the target acceleration, as a deviation (step SC1).

Then, the setting unit 1e of the ECU 10 sets an evaluation point stepwise, for the deviation obtained in step SC1, based on a predetermined map defining the relationship between the deviation and the evaluation point (step SC2).

Then, the evaluation display unit 1f of the ECU 10 defines (determines) a section corresponding to the evaluation point set in step SC2, from among a plurality of sections that constitute the indicator MB, and turns on the determined section (step SC3). More specifically, the illuminated section indicating the evaluation point is located further to the right relative to the middle of the indicator MB as the evaluation point increases, so that the ECU 10 can inform the driver that the amount of depression of the accelerator pedal by the driver is too large, as shown in FIG. 20A and FIG. 20B. Also, the illuminated section indicating the evaluation point is located further to the left relative to the middle of the indicator MB as the evaluation point decreases, so that the ECU 10 can inform the driver that the amount of depression of the accelerator pedal by the driver is too small, as shown in FIG. 20A and FIG. 20B. Also, the middle section of the indicator MB is illuminated when the evaluation point is intermediate, so that the ECU 10 can inform the driver that the driver depresses the accelerator pedal by an appropriate degree, as shown in FIG. 20A and FIG. 20B.

As explained above, the vehicle running control system of this embodiment creates a target speed pattern (target speed controlled variable pattern) using the shape of the course and other information, divides the created target speed pattern into a plurality of speed-pattern regions, and performs assist control on the driver's operation depending on the regions into which the speed pattern is divided. Thus, the system is able to perform the optimum assist control according to the target speed pattern, to meet with the driver's request(s), and efficiently perform control for coordination between the traveling plan and the driver's operation, so that the actual running result of the vehicle becomes closer to the traveling plan.

According to this embodiment, the information concerning regions, such as "acceleration region" and "coasting region", information concerning requests for operations by the driver, such as "accelerator pedal ON" and "accelerator pedal OFF", and information concerning the deviation between the target pattern and the driver's input are displayed on the indicators. Thus, even when assist control is positively effected on the vehicle side, the driver is prevented from feeling uncomfortable about the assist control or feeling that the assist control is abruptly executed. Also, according to this embodiment, the control side has a target speed/acceleration pattern, and is aware of what running condition (running pattern) the vehicle should be in at a certain location (region); therefore, the control side performs positive running control and positively gives the driver the above-indicated items of information, thus assuring further improved compatibility between the driver's operation and vehicle control, due to the interactions between the control side and the vehicle side. Consequently, the above-mentioned tasks can be accomplished with further enhanced performance.

The system of the invention creates a pattern of a controlled variable associated with the speed to be achieved during running of the vehicle, as a speed pattern, divides the created speed pattern into a plurality of regions depending on the running conditions, and performs assist control for assisting in achievement of the traveling plan, for each of the regions, so that vehicle control based on the traveling plan and the driver's operation can be coordinated with further efficiency, thus providing an effect that the traveling plan can be accomplished with further reliability.

The system of the invention outputs information concerning the running conditions corresponding to the regions, and/or information about the deviation between the controlled variable concerning the speed in the speed pattern and the controlled variable concerning the speed entered by the driver to the vehicle, such that the output information can be visually and/or audibly recognized, thus assuring improved compatibility between the vehicle control based on the traveling plan and the driver's operation. As a result, the traveling plan can be accomplished with further improved reliability. In other words, the vehicle running control system of this embodiment performs positive assist control, and positively gives information concerning running conditions and information concerning the deviation, to the driver, thus assuring improved compatibility between the driver's operation and the vehicle control due to the interaction therebetween. Consequently, the traveling plan can be accomplished with further enhanced performance. Also, the vehicle running control system of this embodiment outputs information concerning the running conditions, and/or information concerning the deviation between the speed pattern and the driver's input; therefore, even when assist control is positively effected on the vehicle side, the driver is prevented from feeling uncomfortable with the assist control or feeling that the assist control is abruptly executed.

In this embodiment, the control side creates a traveling plan including a target speed pattern or target acceleration pattern (target speed controlled variable pattern as a pattern of a controlled variable associated with the speed) according to a given course (target traveling path) and tasks (including, for example, the destination, target arrival time to the destination, and importance placed on the fuel efficiency), divides the created target speed pattern or target acceleration pattern into regions in accordance with the running conditions (running pattern), and positively switches assist control, depending on the regions, for improvement of the fuel efficiency, thus making it possible to significantly improve the fuel efficiency as compared with general systems.

In this embodiment, HMI (human machine interface) elements are classified into "indication", "suggestion" and "evaluation", and the HMI corresponding to these items of classification are installed, so as to prevent the driver from feeling uncomfortable when the system positively performs assist control on the vehicle side or when the assist control is switched from one mode to another or feeling that the assist control or switching thereof is abruptly executed. In addition, the system asks the driver to cooperate with the system to accomplish the tasks, thus making it possible to achieve further improved performance for improvement of the fuel efficiency.

The element of "indication" enables the driver to be aware of "what the control side is currently doing" and "what kind of assist is going to be provided". The element of "suggestion" enables the driver to be aware of "what the control side wants the driver to do". The element of "evaluation" enables the driver to be aware of "how much the driver's operations and inputs contribute to accomplishment of the tasks".

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle running control system comprising:
   a speed pattern creating unit that creates a speed pattern according to a target traveling path;
   a running control unit that controls running of the vehicle based on the speed pattern;
   a first speed condition correcting unit that corrects speed conditions in a direction from a start position of the running control toward an end position of the running control on the target traveling path; and
   a second speed condition correcting unit that corrects the speed conditions in a direction from the end position of the running control toward the start position of the running control on the target traveling path.

2. The vehicle running control system according to claim 1, wherein the first speed condition correcting unit corrects acceleration-side speed conditions, and the second speed condition correcting unit corrects deceleration-side speed conditions.

3. The vehicle running control system according to claim 1, wherein the first speed condition correcting unit and the second speed condition correcting unit correct the speed conditions to lower speeds.

4. The vehicle running control system according to claim 3, further comprising a traveling path dividing unit that divides the target traveling path into a plurality of regions at fixed intervals,
wherein the first speed condition correcting unit and the second speed condition correcting unit correct the speed condition for each of the regions into which the target traveling path is divided, and
wherein the first speed condition correcting unit and the second speed correcting unit compare the speed conditions of adjacent ones of the regions, and correct the speed condition of one of the regions having the higher speed, to a lower speed.

5. The vehicle running control system according to claim 3, further comprising a traveling path dividing unit that divides the target traveling path into a plurality of regions at fixed intervals,
wherein the first speed condition correcting unit and the second speed condition correcting unit correct the speed condition for each of the regions into which the target traveling path is divided; and
the first speed condition correcting unit and the second speed condition correcting unit compare the speeds of adjacent ones of the regions to determine an acceleration or a deceleration across the adjacent regions, and corrects the acceleration or the deceleration does not exceed an upper limit thereof.

6. The vehicle running control system according to claim 5, wherein the first speed condition correcting unit and the second speed condition correcting unit correct the acceleration or deceleration across the adjacent regions by correcting the speed of one of the regions to a lower speed.

7. The vehicle running control system according to claim 4, wherein:
the first speed condition correcting unit and the second speed condition correcting unit calculate an addition vector of an acceleration or deceleration across adjacent ones of the regions and a lateral acceleration; and
the first speed condition correcting unit and the second speed condition correcting unit correct a speed, based on the addition vector and a friction circle of each of the regions.

8. The vehicle running control system according to claim 5, wherein:
the first speed condition correcting unit and the second speed condition correcting unit calculate an addition vector of an acceleration or deceleration across adjacent ones of the regions and a lateral acceleration; and
the first speed condition correcting unit and the second speed condition correcting unit corrects a speed, based on the addition vector and a friction circle of each of the regions.

9. The vehicle running control system according to claim 7, wherein the first speed condition correcting unit and the second speed condition correcting unit correct the speed of one of the adjacent regions to a lower speed, so that the addition vector does not go beyond the friction circle of each of the regions.

10. The vehicle running control system according to claim 8, wherein the first speed condition correcting unit and the second speed condition correcting unit correct the speed of one of the adjacent regions to a lower speed, so that the addition vector does not go beyond the friction circle of each of the regions.

11. The vehicle running control system according to claim 4, wherein:
the first speed condition correcting unit and the second speed condition correcting unit calculate a rate of change of acceleration across adjacent ones of the regions; and
the first speed condition correcting unit and the second speed condition correcting unit compare the rate of change of acceleration with a predetermined limit value, and correct a speed.

12. The vehicle running control system according to claim 5, wherein:
the first speed condition correcting unit and the second speed condition correcting unit calculate a rate of change of acceleration across adjacent ones of the regions; and
the first speed condition correcting unit and the second speed condition correcting unit compare the rate of change of acceleration with a predetermined limit value, and correct a speed.

13. The vehicle running control system according to claim 11, wherein, when changes in the speed over adjacent ones of the regions assume a concave shape, the first speed condition correcting unit and the second speed condition correcting unit correct the speed condition of one of the adjacent regions having the highest speed and located at the leading side as viewed in a direction of progression of the speed correction, to a lower speed.

14. The vehicle running control system according to claim 12, wherein, when changes in the speed over adjacent ones of the regions assume a concave shape, the first speed condition correcting unit and the second speed condition correcting unit correct the speed condition of one of the adjacent regions having the highest speed and located at the leading side as viewed in a direction of progression of the speed correction, to a lower speed.

15. The vehicle running control system according to claim 11, wherein, when changes in the speed over adjacent ones of the regions assume a convex shape, the first speed condition correcting unit and the second speed condition correcting unit correct the speed condition of a middle one of the regions having the highest speed, to a lower speed.

16. The vehicle running control system according to claim 12, wherein, when changes in the speed over adjacent ones of the regions assume a convex shape, the first speed condition correcting unit and the second speed condition correcting unit correct the speed condition of a middle one of the regions having the highest speed, to a lower speed.

17. The vehicle running control system according to claim 11, wherein the limit value is set according to a shape of the target traveling path.

18. The vehicle running control system according to claim 12, wherein the limit value is set according to a shape of the target traveling path.

19. The vehicle running control system according to claim 1, wherein the first speed condition correcting unit and the second speed condition correcting unit correct the speed conditions while regarding the vehicle as a mass point model.

20. The vehicle running control system according to claim 19, wherein the first speed condition correcting unit and the second speed condition correcting unit correct lateral force conditions while regarding the vehicle as a rigid body model, after completing the speed correction of the speed condition for each of the regions into which the target traveling path is divided.

21. The vehicle running control system according to claim 1, further comprising a traveling path dividing unit that divides the speed pattern into a plurality of regions corresponding to running conditions, wherein the running control unit performs assist control for assisting in accomplishing a traveling plan, with respect to each of the regions into which the speed pattern is divided.

22. The vehicle running control system according to claim 21, further comprising an evaluation display unit that outputs information concerning the running conditions corresponding to the regions and/or information concerning a deviation between a controlled variable associated with the speed in the speed pattern and a controlled variable associated with the speed entered by the driver to the vehicle, such that the information is visually and/or audibly recognizable.

\* \* \* \* \*